United States Patent
Tome et al.

(10) Patent No.: US 11,632,614 B2
(45) Date of Patent: Apr. 18, 2023

(54) DIFFERENT HEAD DETECTION IN HEADPHONES

(71) Applicant: Google LLC, Mountain View, CA (US)

(72) Inventors: Basheer Tome, Menlo Park, CA (US); Sandeep Singh Waraich, Mountain View, CA (US)

(73) Assignee: Google LLC, Mountain View, CA (US)

(*) Notice: Subject to any disclaimer, the term of this patent is extended or adjusted under 35 U.S.C. 154(b) by 113 days.

(21) Appl. No.: 17/259,608

(22) PCT Filed: Jan. 29, 2020

(86) PCT No.: PCT/US2020/015575
§ 371 (c)(1),
(2) Date: Jan. 12, 2021

(87) PCT Pub. No.: WO2021/154231
PCT Pub. Date: Aug. 5, 2021

(65) Prior Publication Data
US 2021/0377648 A1     Dec. 2, 2021

(51) Int. Cl.
*H04R 1/10* (2006.01)
*H04M 1/60* (2006.01)

(52) U.S. Cl.
CPC ........ *H04R 1/1041* (2013.01); *H04M 1/6066* (2013.01); *H04R 1/1016* (2013.01)

(58) Field of Classification Search
CPC .. H04R 1/1061; H04R 1/1041; H04M 1/6066
See application file for complete search history.

(56) References Cited

U.S. PATENT DOCUMENTS

2013/0279724 A1* 10/2013 Stafford ............... H04R 1/1041
381/74
2018/0279038 A1* 9/2018 Boesen ................. H04W 76/10

FOREIGN PATENT DOCUMENTS

EP          3236639 A1    10/2017
WO     2016196838 A1    12/2016

OTHER PUBLICATIONS

International Search Report and Written Opinion for International Application No. PCT/US2020/015575 dated Oct. 6, 2020. 12 pages.
"International Preliminary Report on Patentability", Application No. PCT/US2020/015575, dated Jul. 28, 2022, 7 pages.

* cited by examiner

*Primary Examiner* — Simon King
(74) *Attorney, Agent, or Firm* — Colby Nipper PLLC

(57) ABSTRACT

Systems and methods are provided for operating a pair of earbuds based whether the earbuds are being worn by the same user or different users. In this regard, one or more processors may determine, based on sensor signals from the pair of earbuds, whether the pair of earbuds are being worn by a same user or different users. Based on determining that the pair of earbuds are being worn by the same user, the pair of earbuds may be operated in a first mode so that one or more functions are controlled based on a first set of input settings. Based on determining that the pair of earbuds are being worn by different users, the pair of earbuds may be operated in a second mode so that the one or more functions of the pair of earbuds are controlled based on a second set of input settings.

20 Claims, 13 Drawing Sheets

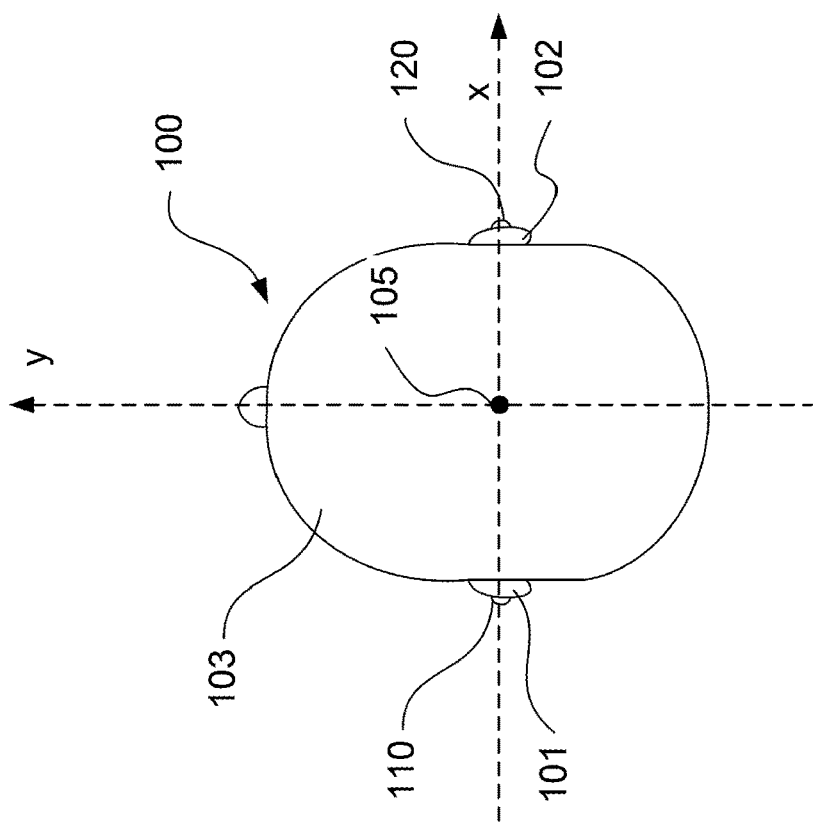
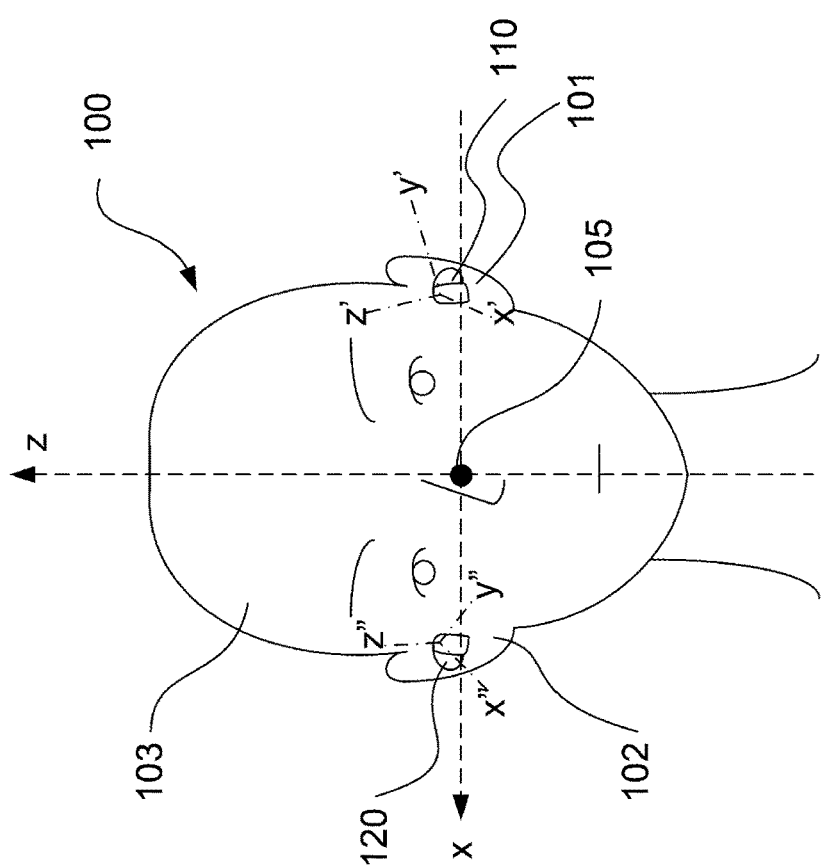
FIGURE 1A
FIGURE 1B

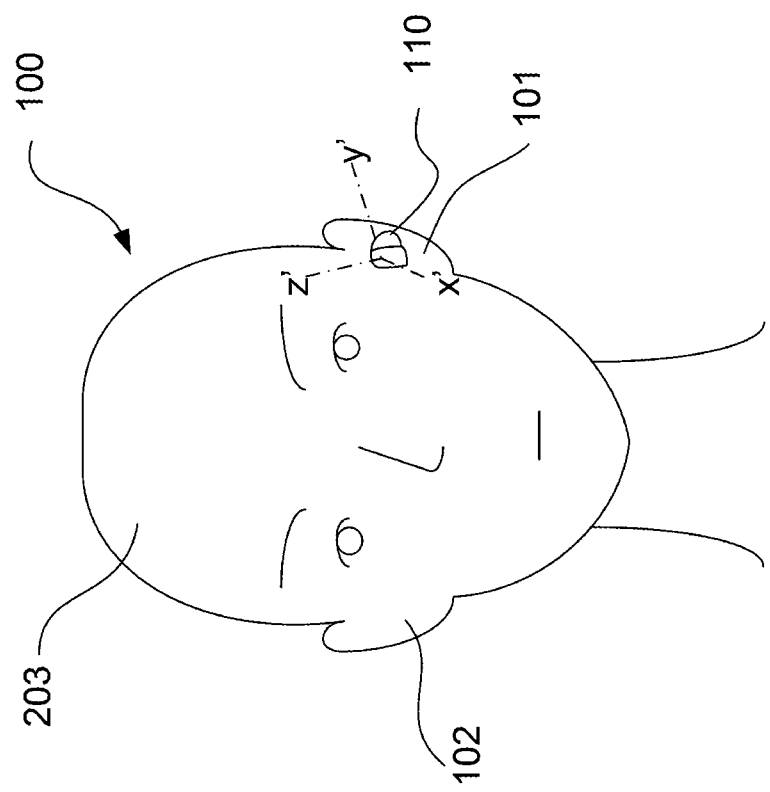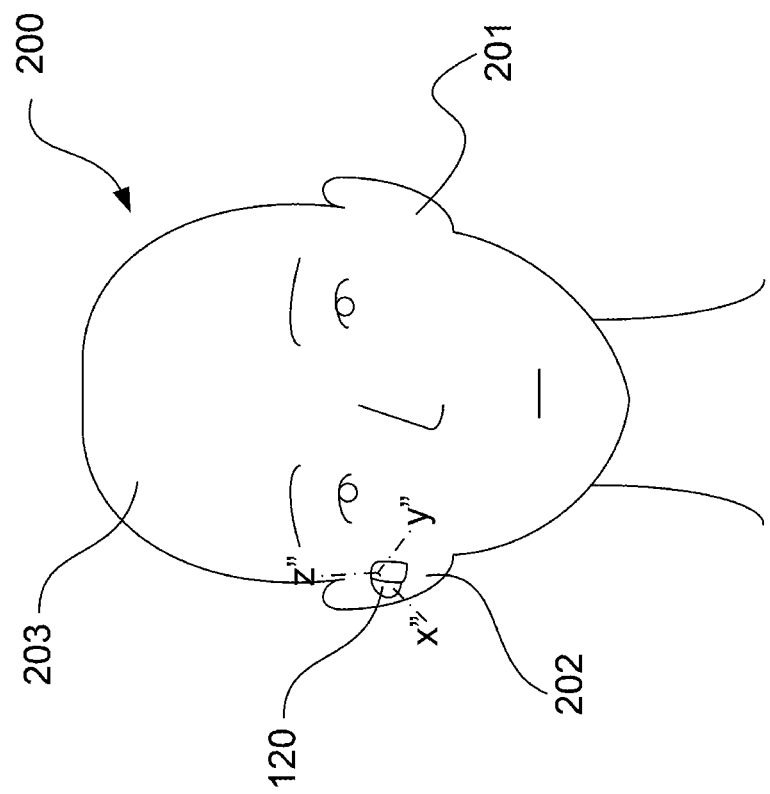
FIGURE 2

DIFFERENT HEAD DETECTION IN HEADPHONES

CROSS-REFERENCE TO RELATED APPLICATION

This application is a national phase entry under 35 U.S.C. § 371 of International Application No. PCT/US2020/015575, filed Jan. 29, 2020, the entire disclosure of which is incorporated herein by reference.

BACKGROUND

A pair of earbuds may be used for a number of purposes, such as audio broadcasting, noise cancelation, voice calls, and translation. Wireless earbuds are earbuds that do not require a wired connection for use. "Truly wireless" earbuds are earbuds that connect to each other wirelessly. Sensors are typically included in wireless earbuds for detecting different conditions, such as whether the wireless earbuds are loose or inserted into ears.

BRIEF SUMMARY

The present disclosure provides for determining, by one or more processors based on sensor signals from a pair of earbuds, whether the pair of earbuds are being worn by a same user or different users; operating, by the one or more processors based on determining that the pair of earbuds are being worn by the same user, the pair of earbuds in a first mode so that one or more functions of the pair of earbuds are controlled based on a first set of input settings; and operating, by the one or more processors based on determining that the pair of earbuds are being worn by different users, the pair of earbuds in a second mode so that the one or more functions of the pair of earbuds are controlled based on a second set of input settings, the second set of input settings being different from the first set of input settings.

The method may further comprise receiving, by the one or more processors while the pair of earbuds are operating in the first mode, a given input; determining, by the one or more processors, a given command corresponding to the given input according to the first set of input settings; and controlling, by the one or more processors based on the given command, a given function of both earbuds of the pair of earbuds. The method may further comprise determining, by the one or more processors, whether the given input is received at a first earbud of the pair of earbuds or a second earbud of the pair of earbuds, wherein controlling the given function of both earbuds is further based on whether the given input is received at the first earbud or the second earbud.

The method may further comprise receiving, by the one or more processors while the pair of earbuds are operating in the second mode, a given input at a first earbud of the pair of earbuds; and determining, by the one or more processors, a given command corresponding to the given input according to the second set of input settings; and controlling, by the one or more processors based on the given command, a given function of the first earbud without affecting a second earbud of the pair of earbuds.

At least one of the first set of input settings and the second set of input settings may include one or more gesture input settings. At least one of the first set of input settings and the second set of input settings may include one or more voice command settings.

The method may further comprise activating, by the one or more processors while operating in the first mode, one or more microphones of a first earbud of the pair of earbuds without activating one or more microphones of a second earbud of the pair of earbuds. The method may further comprise activating, by the one or more processors while operating in the first mode, beamforming for the one or more microphones of the first earbud towards the user wearing the pair of earbuds, wherein the one or more microphones of the first earbud include an array of microphones.

The method may further comprise activating, by the one or more processors while operating in the second mode, one or more microphones of a first earbud of the pair of earbuds and one or more microphones of a second earbud of the pair of earbuds. The method may further comprise activating, by the one or more processors while operating in the second mode, beamforming for the one or more microphones of the first earbud towards a first user and beamforming on the one or more microphones of the second earbud towards a second user, wherein the one or more microphones of the first earbud and the one or more microphones of the second earbud each include an array of microphones.

The method may further comprise controlling, by the one or more processors while operating in the first mode, the pair of earbuds to have a first set of notification settings; and controlling, by the one or more processors while operating in the second mode, the pair of earbuds to have a second set of notification settings, the second set of notification settings being different from the first set of notification settings. The method may further comprise receiving, by the one or more processors from another device, an alert including information on an event; and controlling, by the one or more processors while using the first set of notification settings, the pair of earbuds to output an audio notification including the information on the event. The method may further comprise receiving, by the one or more processors from another device, an alert including information on an event; and controlling, by the one or more processors while using the second set of notification settings, the pair of earbuds to output an audio notification without including the information on the event.

The method may comprise generating, by the one or more processors, states of the pair of earbuds as outputs accessible by one or more applications, the states include whether the pair of earbuds are being worn by a same user or different users; receiving, by the one or more processors, signals from the one or more applications based on the states of the pair of earbuds; and controlling, by the one or more processors, the pair of earbuds to output audio signals based on the received signals.

The disclosure further provides for a pair of earbuds comprising one or more processors, the one or more processors configured to: determine, based on sensor signals from the pair of earbuds, whether the pair of earbuds are being worn by a same user or different users; operate, based on determining that the pair of earbuds are being worn by the same user, the pair of earbuds in a first mode so that one or more functions of the pair of earbuds are controlled based on a first set of input settings; and operate, based on determining that the pair of earbuds are being worn by different users, the pair of earbuds in a second mode so that the one or more functions of the pair of earbuds are controlled based on a second set of input settings, the second set of input settings being different from the first set of input settings.

The one or more processors may be further configured to receive, while the pair of earbuds are operating in the first mode, a given input; determine a given command corresponding to the given input according to the first set of input settings; and control, based on the given command, a given function of both earbuds of the pair of earbuds.

The one or more processors may be further configured to receive, while the pair of earbuds are operating in the second mode, a given input at a first earbud of the pair of earbuds; determine a given command corresponding to the given input according to the second set of input settings; and control, based on the given command, a given function of the first earbud without affecting a second earbud of the pair of earbuds.

The one or more processors may be further configured to control, while operating in the first mode, the pair of earbuds to have a first set of notification settings; and control, while operating in the second mode, the pair of earbuds to have a second set of notification settings, the second set of notification settings being different from the first set of notification settings.

The one or more processors may be further configured to generate states of the pair of earbuds as outputs accessible by one or more applications, the states include whether the pair of earbuds are being worn by a same user or different users; receive signals from the one or more applications based on the states of the pair of earbuds; and control the pair of earbuds to output audio signals based on the received signals.

The disclosure still further provides for a non-transitory computer-computer-readable storage medium storing instructions executable by one or more processors for performing a method. The method comprises determining, based on sensor signals from a pair of earbuds, whether the pair of earbuds are being worn by a same user or different users; operating, based on determining that the pair of earbuds are being worn by the same user, the pair of earbuds in a first mode so that one or more functions of the pair of earbuds are controlled based on a first set of input settings; and operating, based on determining that the pair of earbuds are being worn by different users, the pair of earbuds in a second mode so that the one or more functions of the pair of earbuds are controlled based on a second set of input settings, the second set of input settings being different from the first set of input settings.

BRIEF DESCRIPTION OF THE DRAWINGS

FIGS. 1A and 1B are pictorial diagrams illustrating an example pair of earbuds worn by a same user in accordance with aspects of the disclosure.

FIG. 2 is a pictorial diagram illustrating the pair of earbuds of FIGS. 1A-1B being worn by two different users in accordance with aspects of the disclosure.

DETAILED DESCRIPTION

Overview

Figure 3:
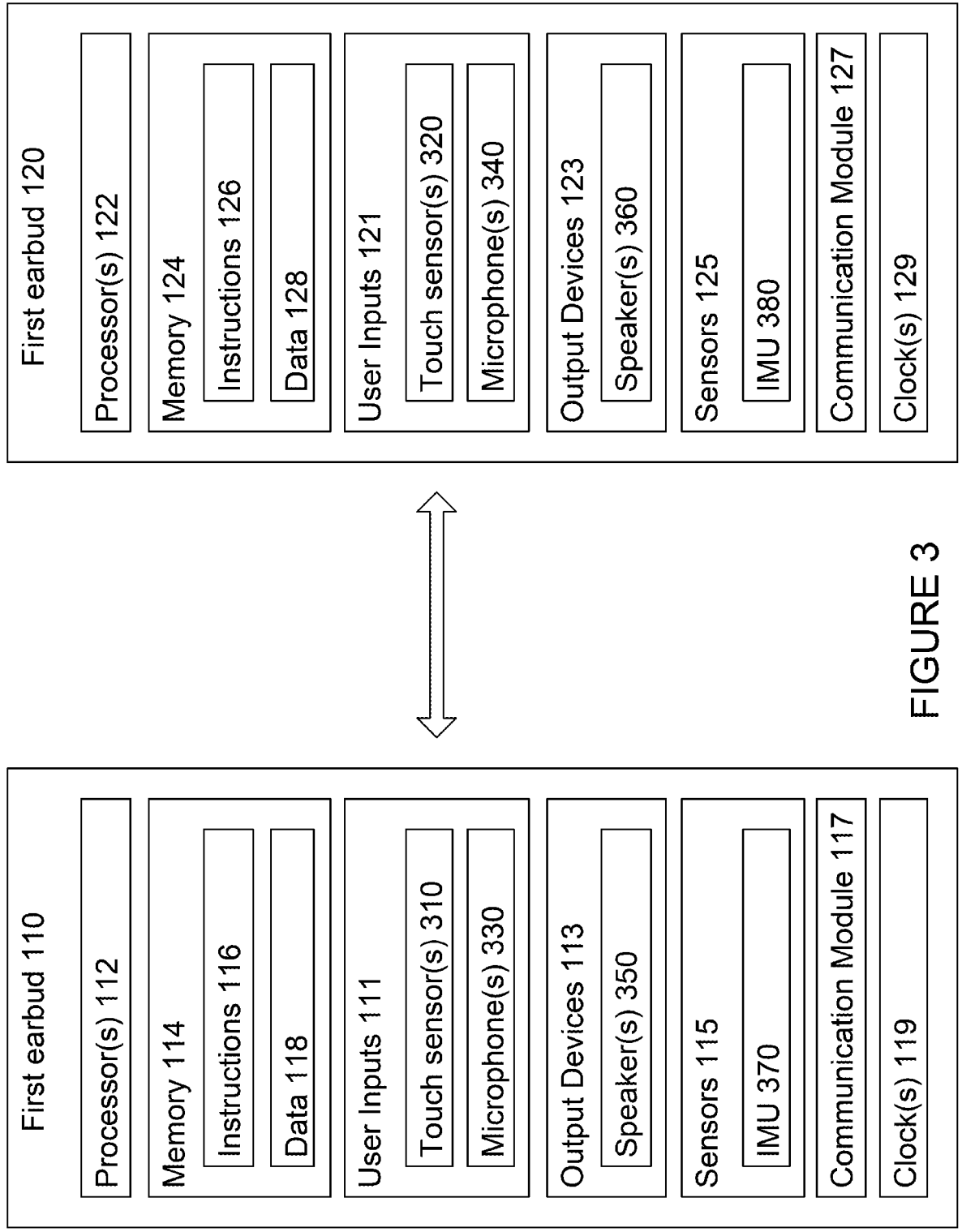
FIG. 3 is a block diagram of the pair of earbuds of FIGS. 1A-B in accordance with aspects of the disclosure.

The technology relates to operating a pair of earbuds based on whether the earbuds are being worn by a single-user or being worn by multiple users. For instance, a user may want a pair of earbuds to operate in different modes depending on whether the user is wearing both of the earbuds, or if the user is sharing the earbuds with another user. In this regard, one or more processors may be configured to determine, based on sensor signals from the pair of earbuds, whether the pair of earbuds are being worn by a same user or different users. Based on the determination, the one or more processors may operate the pair of earbuds in a first mode if the earbuds are being worn by the same user, or operate the pair of earbuds in a second mode if the earbuds are being worn by different users.

For instance, operating in the first and second modes may include using different input settings, such as gesture input settings and voice command settings. According to some examples, when a given input, such as a gesture input or a voice command, is detected while operating in the first mode, a given function of both earbuds of the pair of earbuds may be controlled based on the given input. In contrast, while operating in the second mode, when a given input is detected at a first earbud of the pair of earbuds, a given function of the first earbud may be controlled based on the given input without affecting a second earbud of the pair of earbuds.

Further, components of one or both of the earbuds, such as microphones, may be adjusted based on whether the earbuds are operated in the first or second mode. For example, one or more microphones in one of the earbuds may be activated when the earbuds are operated in the first mode, while one or more microphones in both of the earbuds may be activated when the earbuds are operated in the second mode. As another example, beamforming by microphones towards the same user may be performed when operating in the first mode, while beamforming by microphones in both earbuds may be performed towards two different users when operating in the second mode.

Operating in the first and second modes may additionally or alternatively include operating with different output settings, such as notification settings, speaker settings, and haptics settings. For instance, read-out notifications that include information on an event may be activated for the pair of earbuds when operating in the first mode, while such read-out notifications may be deactivated for the pair of earbuds when operating in the second mode, As another example, stereophonic settings may be used when operating in the first mode, and monophonic settings may be used in the second mode.

Still further, in some instances the one or more processors may be configured to generate states of the earbuds, including whether the earbuds are being worn by the same user or different users, as outputs made accessible to one or more applications. Based on the states of the earbuds, the one or more applications may generate audio contents tailored for single-user or multi-user operations. The pair of earbuds may receive the tailored audio contents and output audio signals based on the received contents.

The technology includes features that improve various functionalities of earbuds. For example, the technology provides for individual control of earbud functions by multiple users while operating in the shared mode. The technology also provides notification capabilities with additional user privacy protections when the earbuds are in the shared mode. By adjusting components and features in one or both earbuds based on the mode of operation, signal quality may be improved as well as power efficiency and battery life. Further, by sharing the states of the earbuds with other applications, the technology promotes development of new features by other developers.

Example Systems

Example systems are described herein with reference to FIGS. 1A-4B, which include a pair of earbuds configured to operate in different modes depending on whether they are being worn by a same user or different users. As described in detail below, the pair of earbuds may include sensors configured to generate sensor signals, and one or more processors configured to determine, based on the sensor signals, whether the earbuds are being worn by a same user or different users. The pair of earbuds may further include various components, such as input devices and output devices, which may be controlled by the one or more processors to operate with different settings based on the mode of operation.

FIGS. 1A and 1B illustrate a user 100 wearing a pair of earbuds including a first earbud 110 and a second earbud 120. FIG. 1A shows a front view of the user 100 and FIG. 1B shows a top view of the user 100. For example as shown, the first earbud 110 may be configured to be worn in a left ear 101 of the user 100, and the second earbud 120 may be configured to be worn in a right ear 102 of the user 100. The earbuds 110, 120 may be wireless in that they do not require a wired connection for use. For instance, the wireless earbuds may receive signals wirelessly such as from a music player, phone, or other device to perform a number of functions, such as to generate output, to communicate with each other and/or other devices, to be charged, etc. The earbuds 110, 120 may be truly wireless, in that they also do not require a wired connection in order to communicate with each other. The earbuds 110, 120 may be configured to have physical features, such as ear tips, that allow the earbuds 110, 120 to securely and comfortably fit in the ears 101, 102 respectively.

As further shown in FIGS. 1A and 1B, while being worn by the same user 100, the first earbud 110 and the second earbud 120 are configured to have fixed positions with respect to the user's ears 101 and 102, as well as with respect to each other. As such, the first earbud 110 and the second earbud 120 may be considered as attached to a same rigid body—the head 103 of the user 100—and move along with the same rigid body. Motions of the user's head 103 may be defined with respect to an inertial frame of the user's head 103. For example, the inertial frame may be defined by various axes through the user's head 103, such as a vertical axis ("z-axis"), a first horizontal axis ("x-axis"), and a second horizontal axis ("y-axis"). The x-, y-, and/or z-axes may intersect at a point 105.

As shown in FIG. 1A, the first earbud 110 and the second earbud 120 may each also have a respective inertial frame (indicated by dash-dot lines). The inertial frame for each of the first earbud 110 and the second earbud 120 may be defined by an Inertial Measurement Unit (IMU) therein. For example, the inertial frame may be defined by axes of a 3-axes accelerometer and/or axes of a 3-axes gyroscope. In some instances, the accelerometer and the gyroscope in an IMU may have the same set of axes such that both measure motion with respect to the same set of axes. For example as shown, the inertial frame of the first earbud 110 may be defined by x'-, y'-, and z'-axes, and the inertial frame of the second earbud 120 may be defined by x"-, y"-, and z"-axes. Further as shown, depending on how the first earbud 110 and the second earbud 120 are being worn, and other factors such as ear anatomy, the inertial frame of the first earbud 110 and the inertial frame of the second earbud 120 may not align with each other, or with the inertial frame of the user's head 103.

FIG. 2 illustrates two different users 100 and 200 sharing the pair of earbuds 110, 120. For instance as shown, the first earbud 110 may be worn in the left ear 101 of the user 100, while the second earbud 120 may be worn in the right ear 202 of the user 200. As further shown in FIG. 2, while being worn by two different users 100, 200, the first earbud 110 may be configured to have a fixed position with respect to the left ear 101 of user 100, the second earbud 120 may be configured to have a fixed position with respect to the right ear 202 of user 200. In this regard, the first earbud 110 and the second earbud 120 may be considered as attached to two different rigid bodies—the head 103 of the user 100 and the head 203 of the user 200, respectively, and move along with two different rigid bodies. Although not shown, the inertial frame of the second user's head 203 may also be defined in terms of axes. Similarly, the inertial frame of the first earbud 110 may not align with the inertial frame of the head 203 of the user 200.

FIG. 3 is a functional block diagram of the pair of earbuds 110, 120 in which the features described herein may be implemented. It should not be considered as limiting the scope of the disclosure or usefulness of the features described herein. For example as shown, the first earbud 110 may contain one or more processors 112, memory 114 and other components typically present in general purpose computing devices, and the second earbud 120 may similarly contain one or more processors 122, memory 124 and other components typically present in general purpose computing devices. For example, the processors 112 and memory 114 may be part of a microcontroller unit ("MCU").

Memories 114, 124 can store information accessible by the one or more processors 112, 122, including instructions 116, 126, that can be executed by the one or more processors 112, 122. Memories 114, 124 can also include data 118, 128 that can be retrieved, manipulated or stored by the processors 112, 122. The memories can be of any non-transitory type capable of storing information accessible by the processor, such as a hard-drive, memory card, ROM, RAM, DVD, CD-ROM, write-capable, and read-only memories.

The instructions 116, 126 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118, 128 can be retrieved, stored or modified by the one or more processors 112, 122 in accordance with the instructions 116, 126. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112, 122 can be any conventional processors, such as a commercially available microprocessor ("MCU") or digital signal processor ("DSP"). Alternatively, the processors can be dedicated components such as an application specific integrated circuit ("ASIC") or other hardware-based processor. Although not necessary, the earbuds 110, 120 may include specialized hardware components to perform specific computing processes.

Although FIG. 3 functionally illustrates the processor, memory, and other elements of earbuds 110, 120 as being within the same block, the processor, computer, computing device, or memory can actually comprise multiple processors, computers, computing devices, or memories that may or may not be stored within the same physical housing. For example, the memory can be a hard drive or other storage media located in housings different from that of the earbuds 110, 120. Accordingly, references to a processor, computer, computing device, or memory will be understood to include references to a collection of processors, computers, computing devices, or memories that may or may not operate in parallel.

Further as shown in FIG. 3, earbuds 110, 120 may include one or more user inputs, such as user inputs 111, 121 respectively. For example, users may be able to control various functions of the earbuds 110, 120 using the user inputs 111, 121, such as turning audio on and off, adjusting volume, etc. Inputs 111, 121 may include mechanical actuators, soft actuators, periphery devices, sensors, and/or other components. For instance, inputs 111, 121 may include input devices configured to detect gesture input, such as one or more touch sensors 310, 320. As examples, such touch sensors 310, 320 may be implemented using capacitive sensors or optical sensors. Inputs 111, 121 may include input devices configured to detect vibrations or sounds, such as one or more microphones 330, 340. In some instances, the microphones 330, 340 may each include an array of two or more microphones configured to perform beamforming.

Earbuds 110, 120 may include one or more outputs devices, such as output devices 113, 123 respectively. For instance, output devices may include one or more speakers 350, 360, transducers or other audio outputs, a user display, a haptic interface or other tactile feedback that provides non-visual and non-audible information to the user. For example, speakers 350, 360 in output devices 113, 123 may be used to play music or multimedia files, or emitting audio for notifications, navigational or other guidance, voice calls, translated speech, etc. As another example, output device 113 may include one or more devices configured to generate electrical or magnetic signals that can be detected by sensors in earbud 120, and similarly, output device 123 may include one or more devices configured to generate electrical or magnetic signals that can be detected by sensors in earbud 110.

Earbuds 110, 120 may include one or more sensors, such as sensors 115, 125 respectively. For instance, sensors 115, 125 may include motion sensors, such as one or more Inertial Measurement Unit(s) ("IMU") 370, 380. According to some examples, the IMUs 370, 380 may each include one or more gyroscope(s), such as a 3-axis gyroscope. For example, a gyroscope in the IMU 370 may be configured to measure angular motion, such as angular velocity and rotational angle, about x'-, y'-, and z'-axes for the first earbud 110, and the gyroscope in IMU 380 may measure angular motion, such as angular velocity and rotational angle, about x"-, y"-, and z"-axes for the second earbud. The IMUs 370, 380 may further include one or more accelerometer(s), such as a 3-axis accelerometer. For example, an accelerometer in the IMU 370 may be configured to measure linear motion, such as linear acceleration, along x'-, y'-, and z'-axes for the first earbud 110, and an accelerometer in the IMU 380 may be configured to measure linear motion, such as linear acceleration, along x"-, y"-, and z"-axes for the second earbud 120.

As other examples, the sensors 115, 125 may include one or more optical sensor(s), such as a camera, an IR sensor, a photoplethysmography (PPG) sensor, etc. The sensors 115, 125 may also include one or more electrical sensor(s), such as a capacitive sensor, an inductive sensor, etc. The sensors 115, 125 may further include one or more magnetic sensors, such as a Hall Effect sensor, a near-field magnetic induction (NFMI) communication sensor, etc. Still further, the sensors 115, 125 may include positioning sensor(s), such as a compass, a GPS chipset, etc. Additionally, the sensors 115, 125 may include sensors used in the user inputs 111, 121, such as one or more microphones, touch sensors, etc. Other examples of sensors may further include a barometer, a vibration sensor, a heat sensor, a radio frequency (RF) sensor, a magnetometer, and a barometric pressure sensor. Additional or different sensors may also be employed.

In order to obtain information from and send information to each other, as well as to other remote devices, earbuds 110, 120 may each include a communication module, such as communication modules 117, 127 respectively. The communication modules may enable wireless network connections, wireless ad hoc connections, and/or wired connections. Via the communication modules 117, 127, the earbuds 110, 120 may establish communication links, such as wireless links. The communication modules 117, 127 may be configured to support communication via cellular, LTE, 4G, WiFi, GPS, and other networked architectures. The communication modules 117, 127 may be configured to support Bluetooth®, Bluetooth LE, near field communications, and non-networked wireless arrangements. The communication modules 117, 127 may support wired connections such as a USB, micro USB, USB type C or other connector, for example to receive data and/or power from a laptop, tablet, smartphone or other device.

The communication modules 117, 127 may be configured to measure signal strengths for wireless connections. For instance, wireless connections may be established between the earbuds 110, 120 and other remote devices. For example, communication modules 117, 127 may be configured to measure power of a link when data is transmitted and power of the link when data is received. As another example, communication modules 117, 127 may be configured to measure received signal strength indicator (RSSI) of a Bluetooth® connection. In some instances, communication modules 117, 127 may be configured to transmit the measured power or signal strengths to another device, including to each other and/or another remote device.

The earbuds 110, 120 may each include one or more internal clocks 119, 129. The internal clocks may provide timing information, which can be used for time measurement for apps and other programs run by the computing devices, and basic operations by the computing devices, sensors, inputs/outputs, GPS, communication system, etc. In some instances, the earbuds 110, 120 may each include a plurality of clocks. For example, clocks 119 may include one or more clocks in a Bluetooth module or chipset, an IMU clock, and an MCU clock; and clocks 129 may also include one or more clocks in a Bluetooth module or chipset, an IMU clock, and an MCU clock. In some instances, a first Bluetooth clock in a Bluetooth module of earbud 110 may be configured as a "master clock," and a second Bluetooth clock in a Bluetooth module of earbud 120 may be configured as an "estimated clock" that is synchronized to the master clock.

Figure 4:
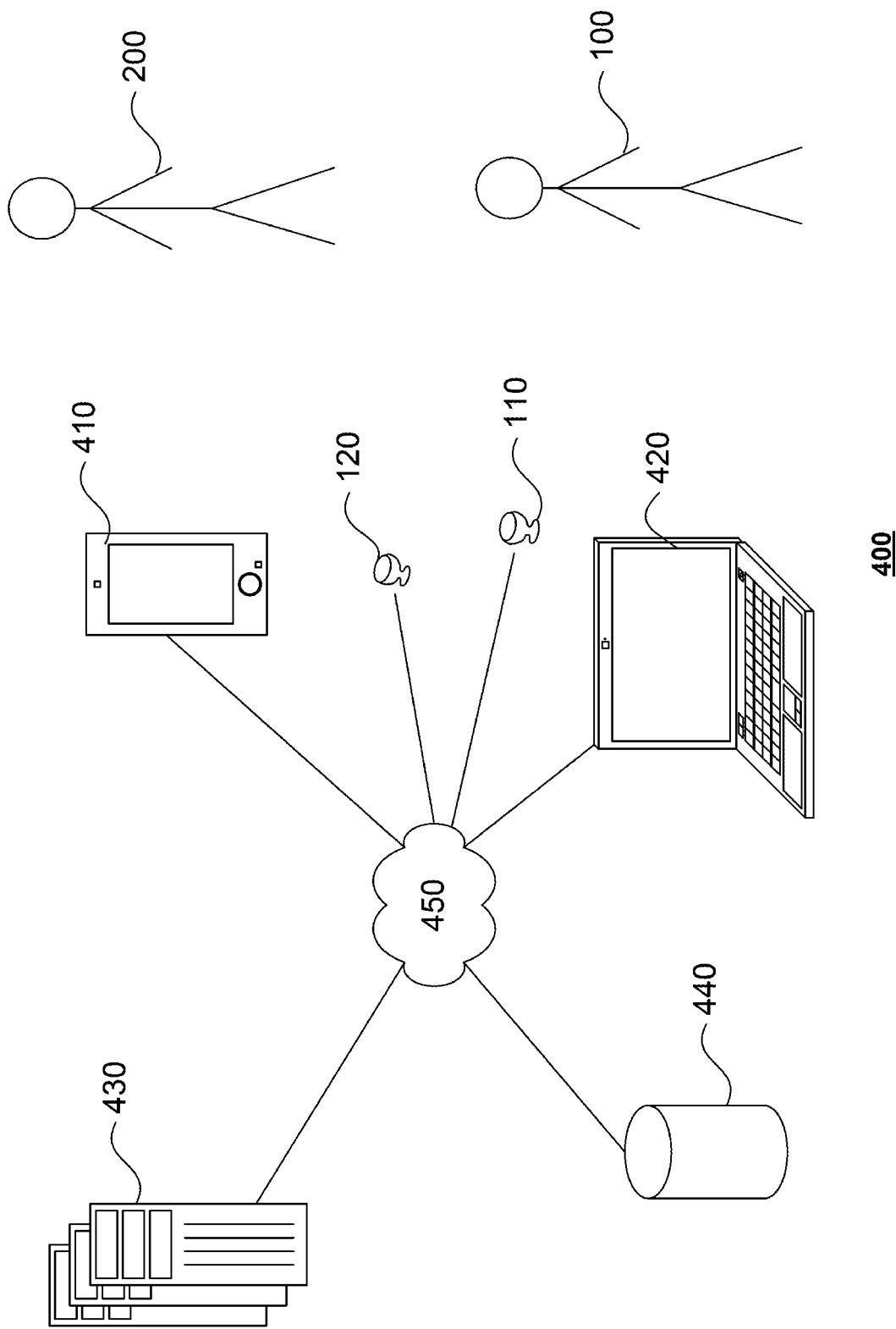
FIG. 4 is a block diagram of an example system including the pair of earbuds of FIGS. 1A-B in accordance with aspects of the disclosure.

Using the communication modules 117, 127, earbuds 110, 120 may communicate with other devices in a system via a network. For instance, FIG. 4 is a pictorial diagram illustrating an example system 400 in which the features described herein may be implemented. The system 400 may include the earbuds 110, 120, computing devices 410, 420, 430, and a storage system 440. As shown, the earbuds 110, 120, computing devices 410, 420, 430, and storage system 440 can each be at different nodes of a network 450 and capable of directly and indirectly communicating with other nodes of network 450. Although only a few computing devices are depicted in FIG. 4, it should be appreciated that a typical system can include a large number of connected computing devices, with each different computing device being at a different node of the network 450.

The network 450 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 410, 420, 430 may be configured similarly to the earbuds 110, 120, with one or more processors, memory and instructions as described above. For instance, computing devices 410 and 420 may each be a client device intended for use by a user, such as user 100 or 200, and have all of the components normally used in connection with a personal computing device such as a central processing unit (CPU), memory (e.g., RAM and internal hard drives) storing data and instructions, user inputs and/or outputs, sensors, communication module, positioning system, clock, etc. For example, communication modules of computing devices 410, 420 may similarly include one or more antennas for transmitting and/or receiving signals, such as Bluetooth® signals, and may also be configured to measure signal strengths of communication links. As another example, computing devices 410, 420 may have the same and/or different types of user inputs and/or outputs as earbuds 110, 120, such as a screen or touchscreen for displaying texts, images, videos, etc. As yet another example, computing device 430 may be a server computer and may have all of the components normally used in connection with a server computer, such as processors, and memory storing data and instructions.

The computing devices 410, 420, and 430 may each comprise a full-sized personal computing device, or may alternatively comprise mobile computing devices capable of wirelessly exchanging data with a server over a network such as the Internet. For example, computing device 410 may be a mobile device, such as a mobile phone as shown in FIG. 4, or some other mobile device such as a wireless-enabled PDA. As another example, computing device 420 may be a laptop computer as shown in FIG. 4, or some other computing device such as a desktop computer, a tablet, or other smart device that is capable of obtaining information via communication links. In other examples (not shown), system 400 may additionally or alternatively include wearable devices, such as a smartwatch, a head mount device, etc.

As with memories 114, 124, storage system 440 can be of any type of computerized storage capable of storing information accessible by one or more of the earbuds 110, 120, and computing devices 410, 420, 430, such as a hard-drive, memory card, ROM, RAM, DVD, CD-ROM, write-capable, and read-only memories. In addition, storage system 440 may include a distributed storage system where data is stored on a plurality of different storage devices which may be physically located at the same or different geographic locations. Storage system 440 may be connected to the computing devices via the network 450 as shown in FIG. 4 and/or may be directly connected to any of earbuds 110, 120, and computing devices 410, 420, 430.

Example Methods

Figure 6A:
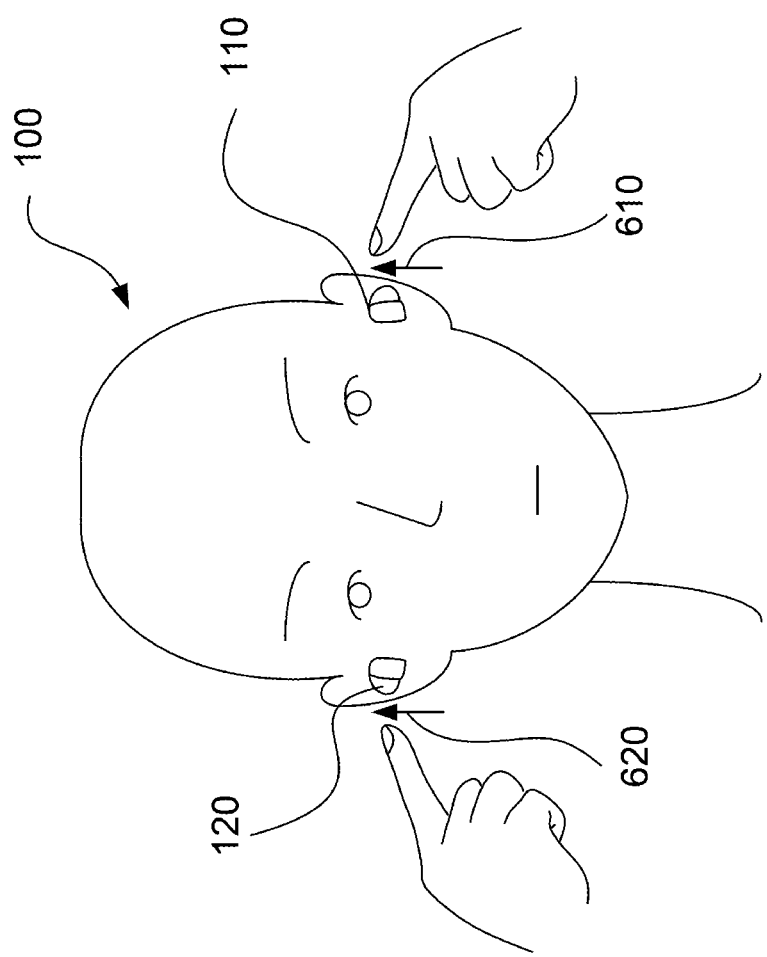
FIGS. 6A and 6B are pictorial diagrams illustrating operations of a pair of earbuds with different gesture input settings based on states of the pair of earbuds in accordance with aspects of the disclosure.
Figure 6B:
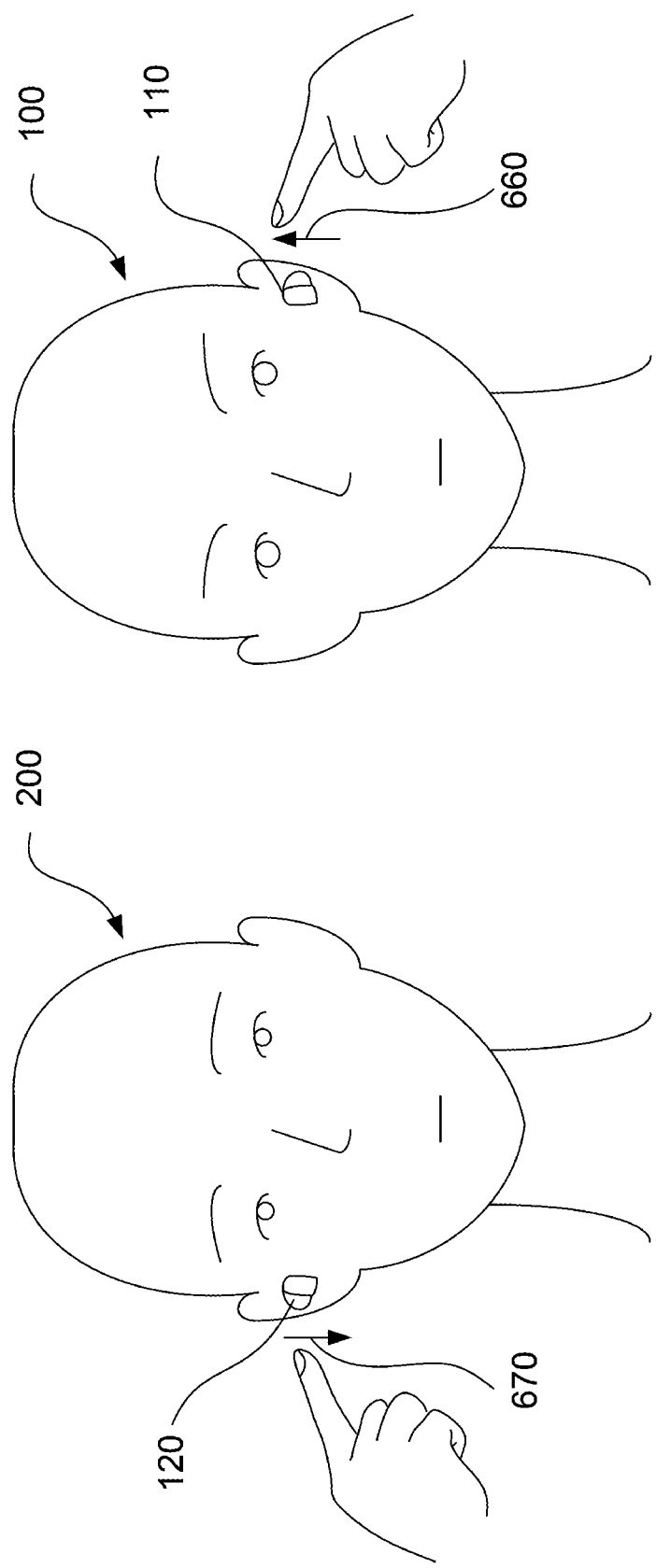
Figure 7A:
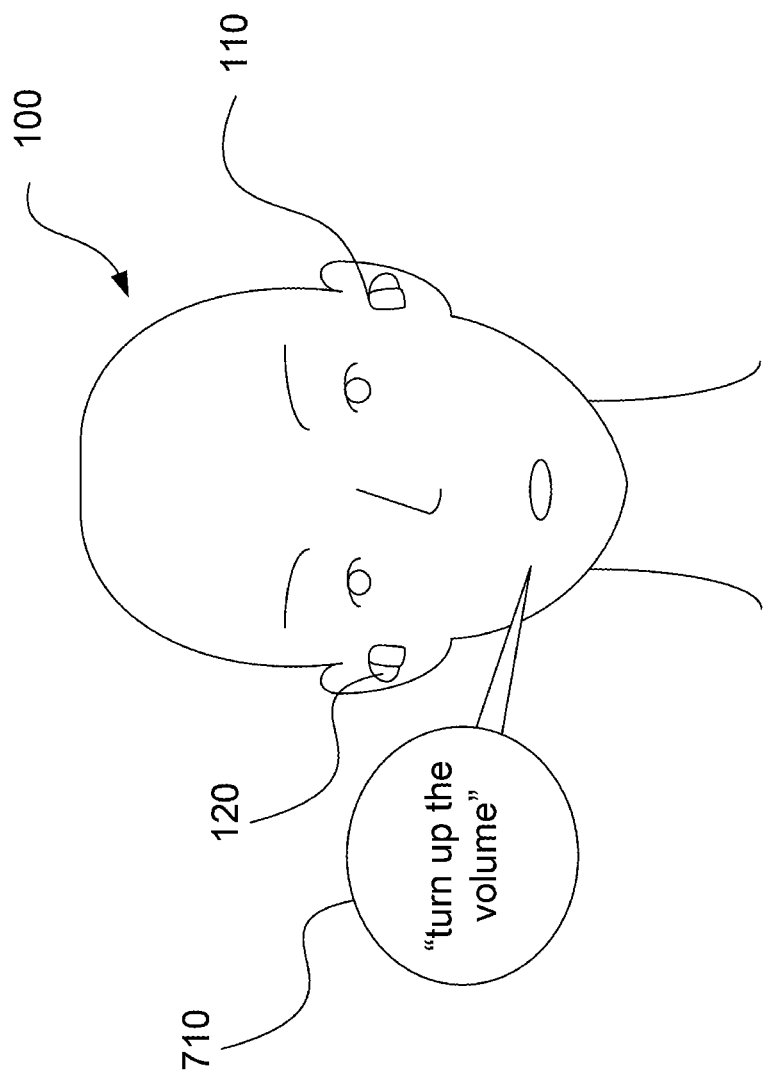
FIGS. 7A and 7B are pictorial diagrams illustrating operations of a pair of earbuds with different voice command settings based on states of the pair of earbuds in accordance with aspects of the disclosure.
Figure 7B:
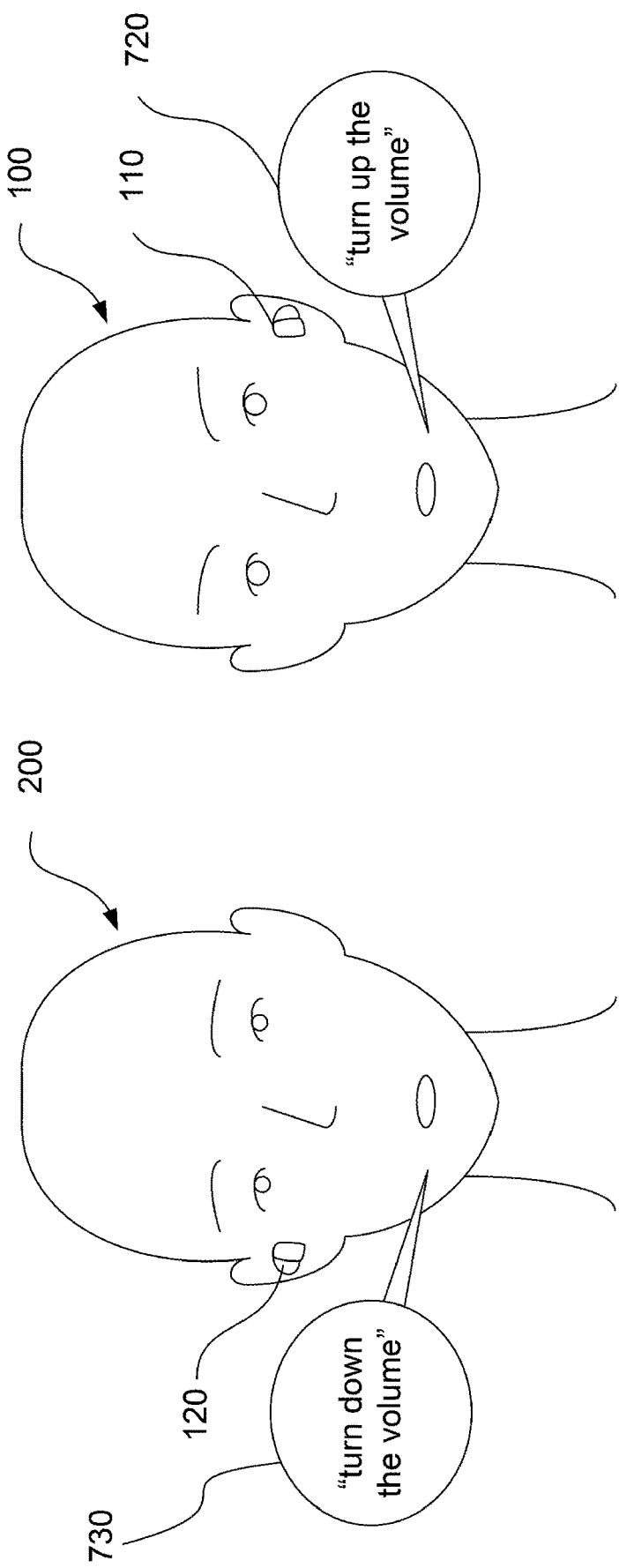
Figure 8:
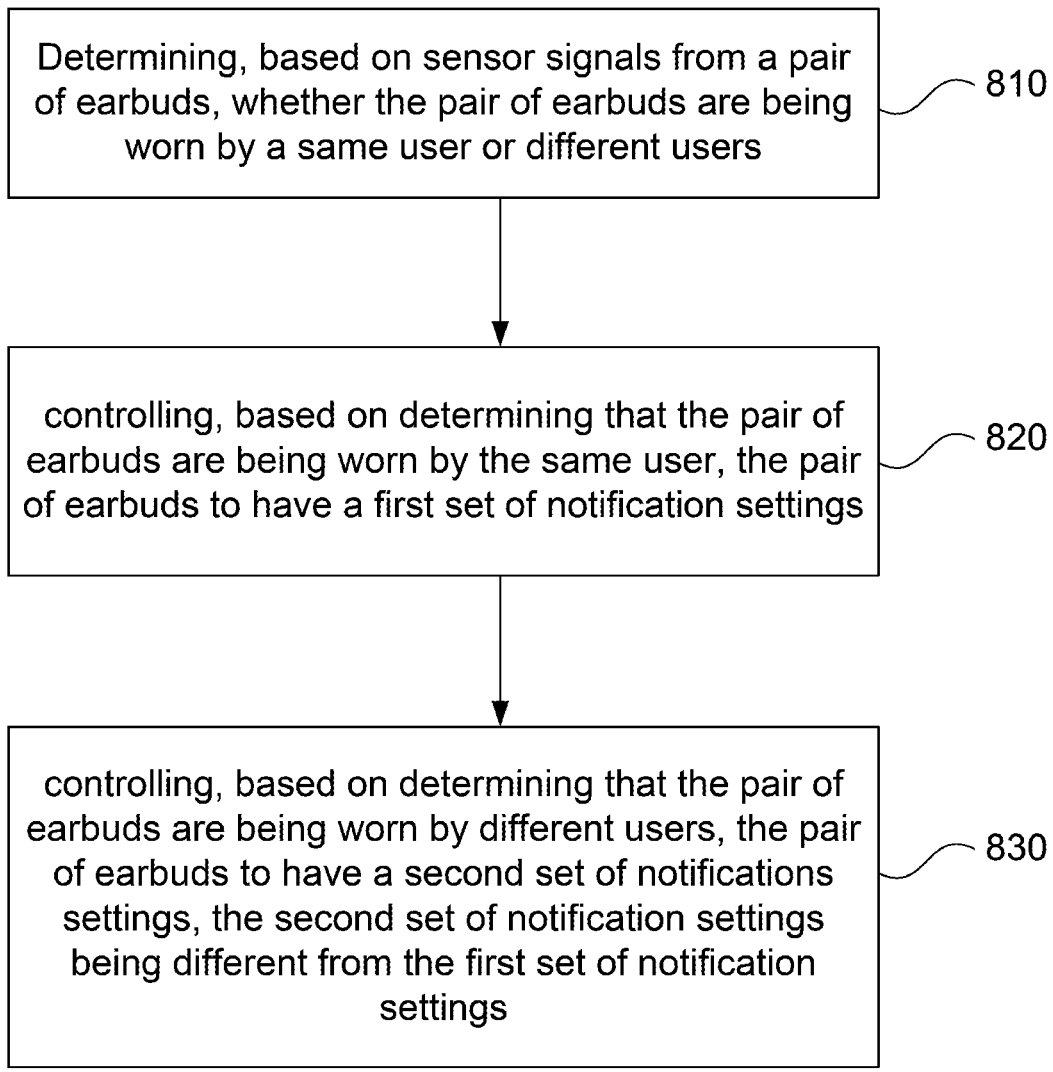
FIG. 8 is a flow diagram showing operations of a pair of earbuds with different notification settings based on states of the pair of earbuds in accordance with aspects of the disclosure.
Figure 9A:
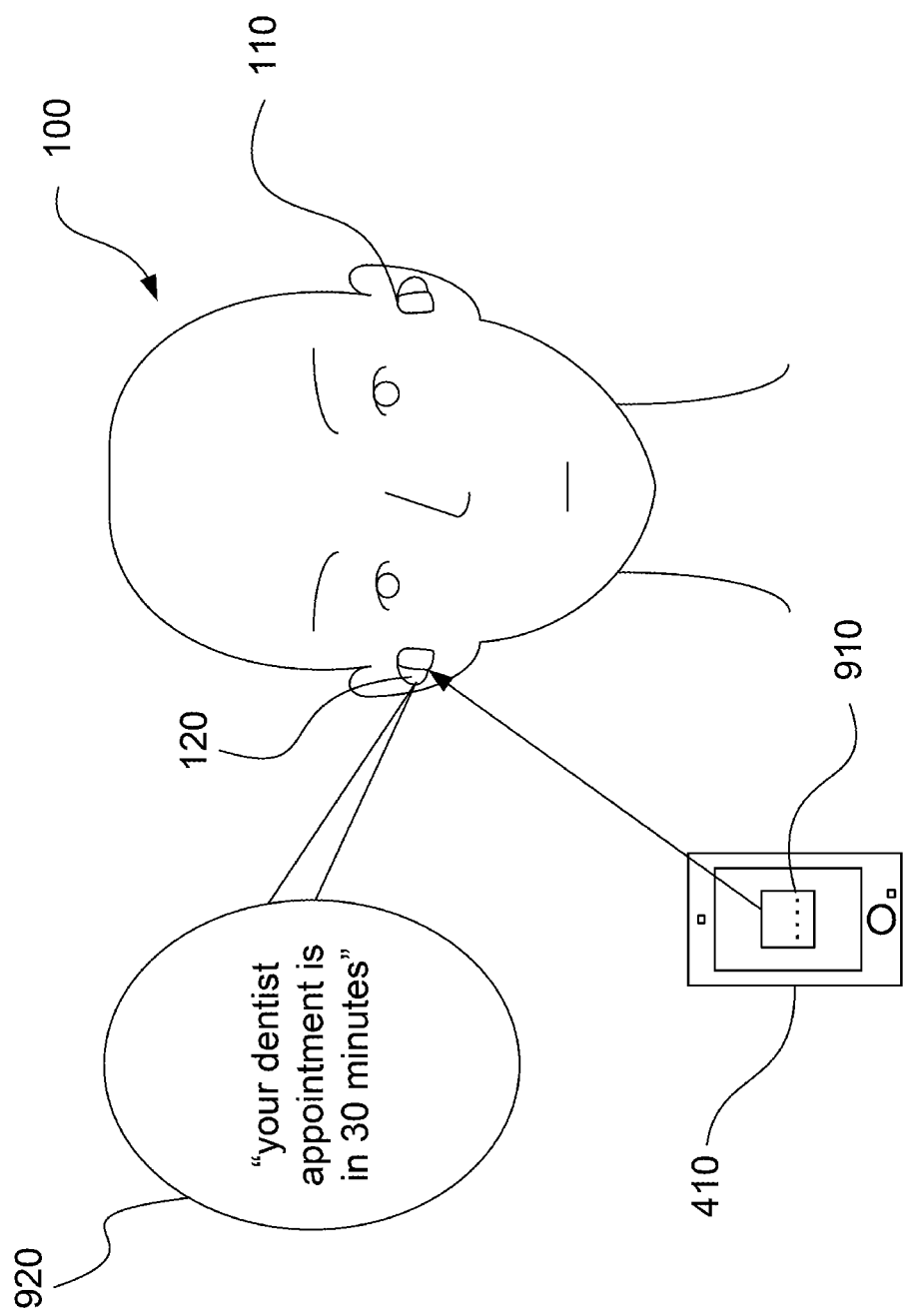
FIGS. 9A and 9B are pictorial diagrams illustrating operations of a pair of earbuds with different notification settings based on states of the pair of earbuds in accordance with aspects of the disclosure.
Figure 9B:
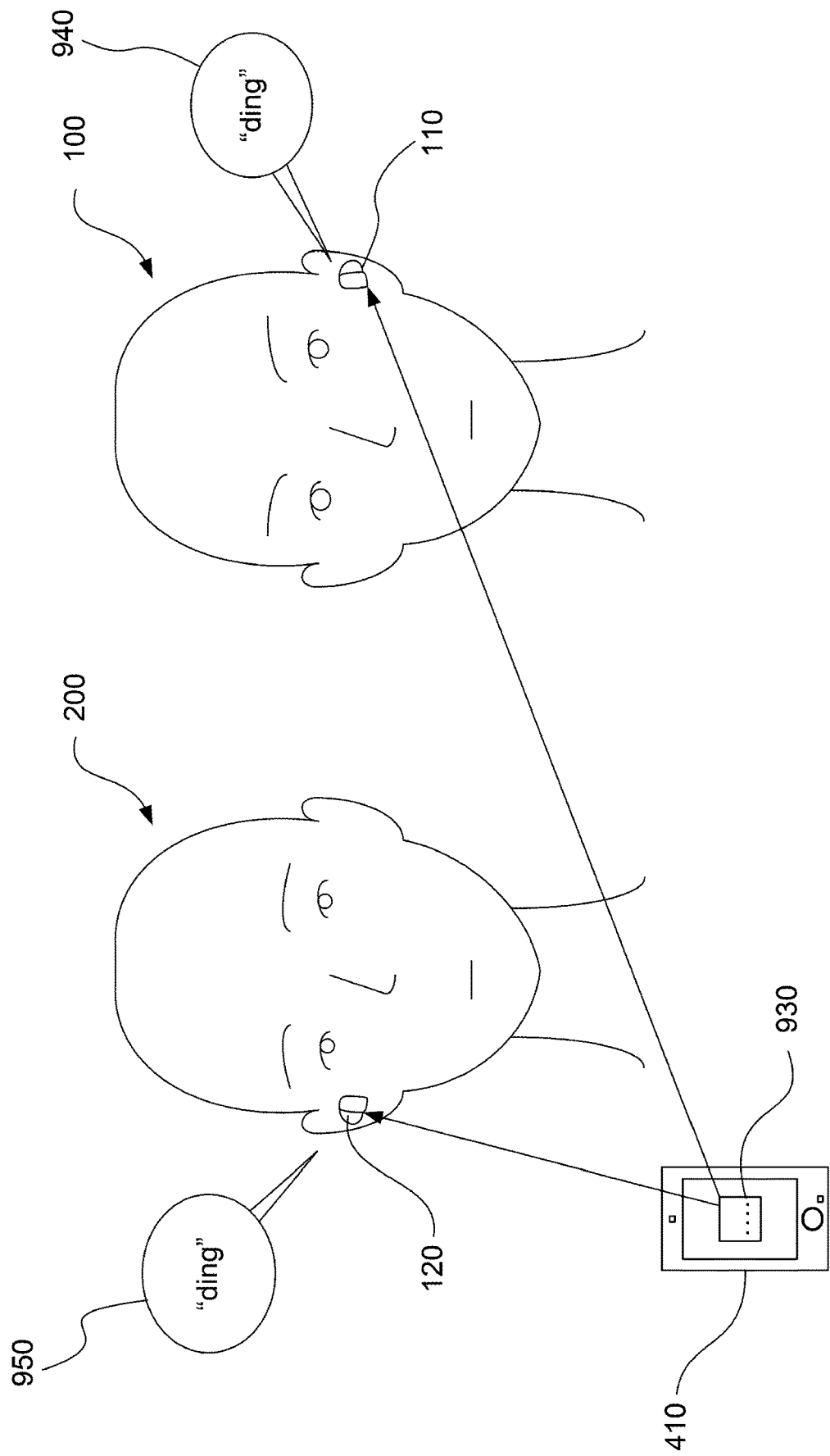
Figure 10:
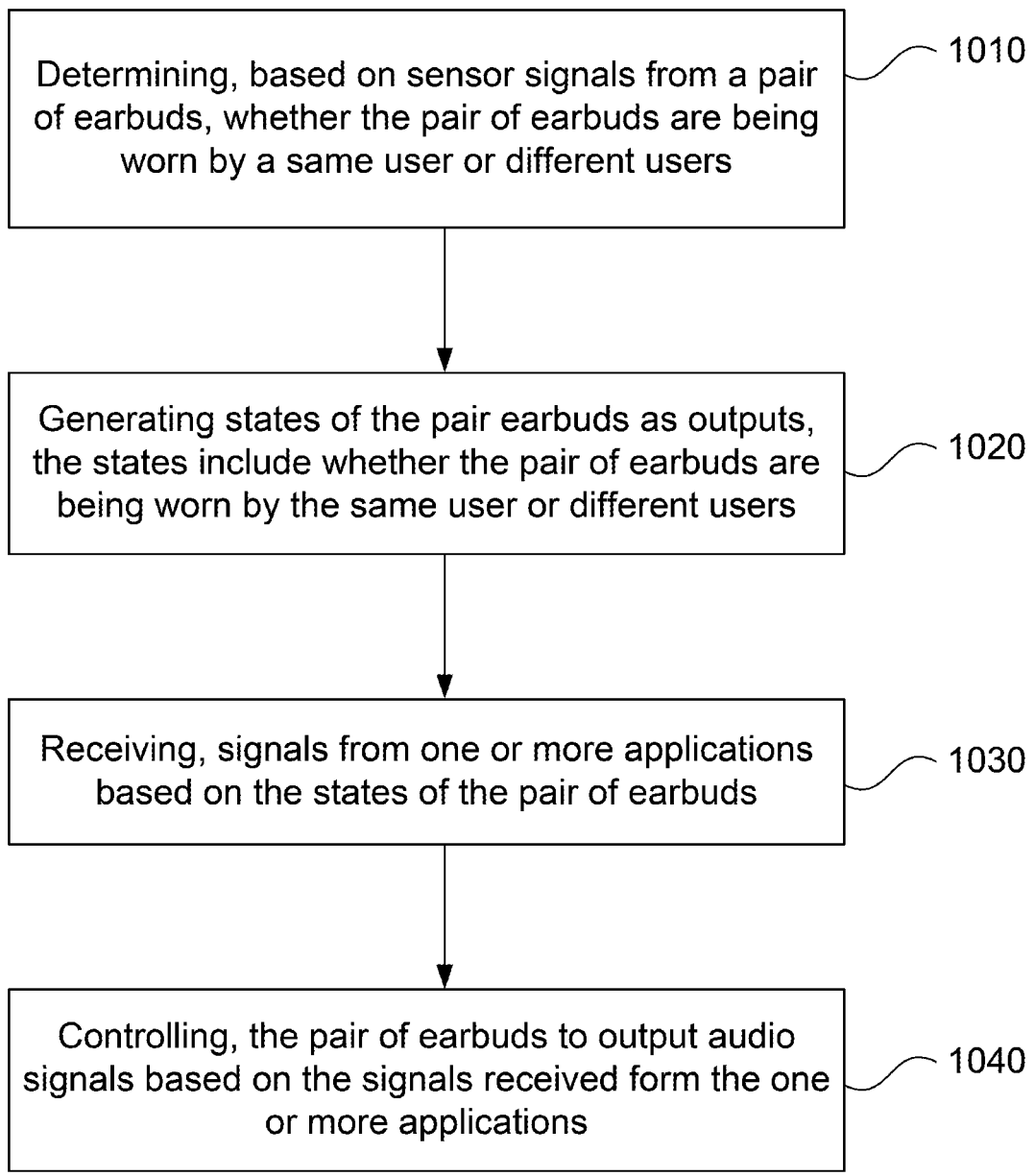
FIG. 10 is a flow diagram showing generating states of a pair of earbuds as output in accordance with aspects of the disclosure.

Further to example systems described above, example methods are now described herein with reference to FIGS. 5-10. These example methods illustrate how a pair of earbuds may be operated in different modes depending on whether the earbuds are being worn by a same user or different users. For instance, FIG. 5-7A show example methods of operating a pair of earbuds with different input settings. Specifically, FIGS. 6A-6B illustrate operating a pair of earbuds with different gesture input settings, and FIGS. 7A-7B illustrate operating a pair of earbuds with different voice command settings. FIG. 8-9B illustrate operating a pair of earbuds with different notification settings. FIG. 10 shows generating states of a pair of earbuds, including whether the earbuds are being worn by a same user or different users, as outputs accessible by one or more applications. These example methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 5:
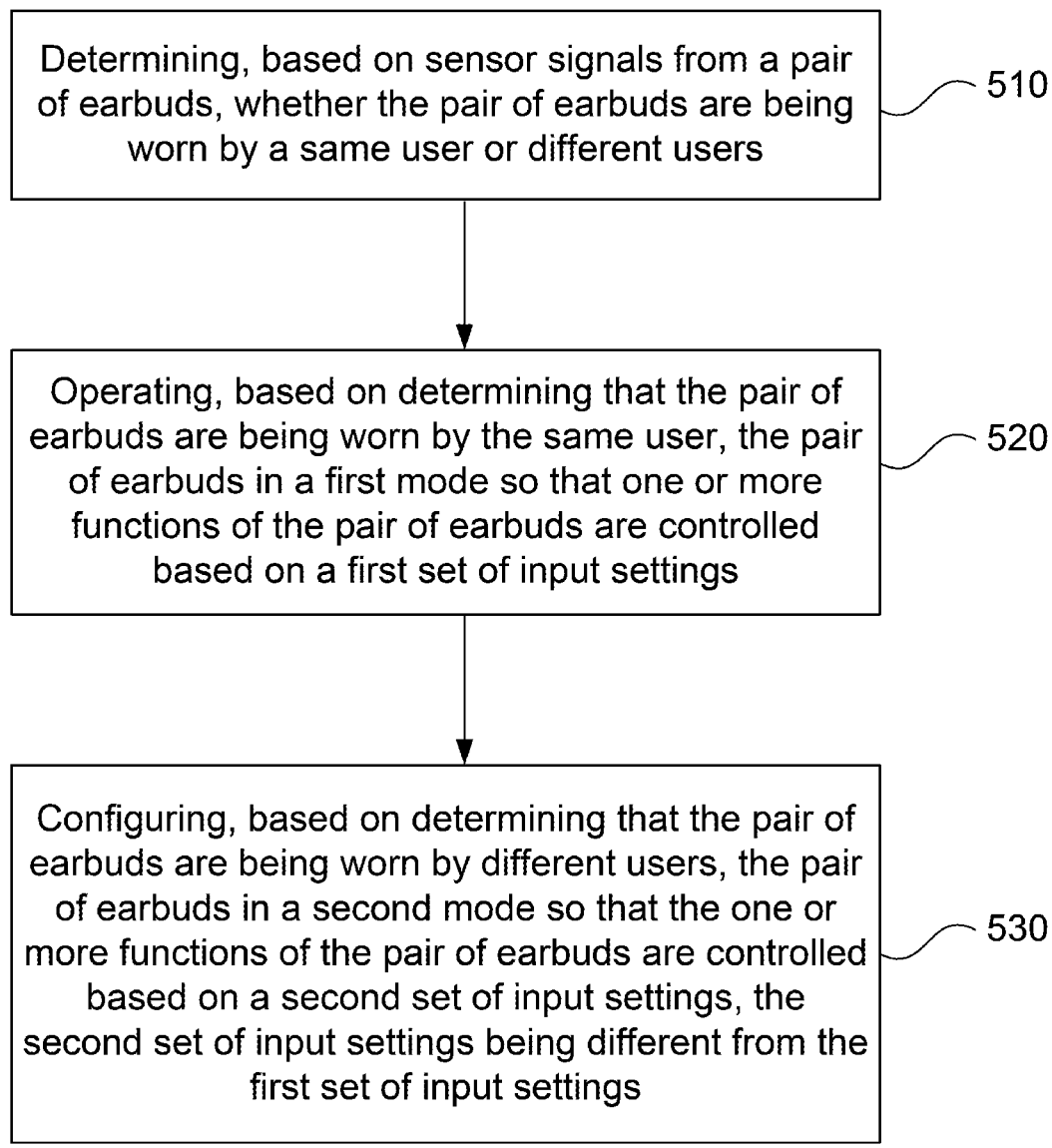
FIG. 5 is a flow diagram showing operations of a pair of earbuds with different input settings based on states of the pair of earbuds in accordance with aspects of the disclosure.

FIG. 5 shows an example flow diagram 500 for operating a pair of earbuds, such as earbuds 110, 120 of FIGS. 1A-1B, with different input settings. It should be understood that the operations involved in the flow diagram 500 need not be performed in the precise order described. Rather, various operations may be handled in a different order or simultaneously, and operations may be added or omitted.

Flow diagram 500 may be performed by one or more processors, such as one or more processors 112 and/or 122 shown in FIG. 3. For example, processors 112 and 122 may both receive data, such as sensor signals from sensors of the respective earbuds 110, 120, make various determinations, and operate the respective earbuds 110, 120 as shown in the flow diagram 500. Alternatively, one of the earbuds 110, 120 may function as a "master" and the other may function as a "slave" such that processors 112 and 122 may perform different functions. For example, sensor signals may be received by both processors 112 and 122, but all the sensor signals may then be sent to the master processor 112 for analysis and determination of the states of the earbuds. As another example, audio files may be sent as audio signals over a wireless connection, such as by a paired device, to the master processor 112 of earbud 110, which may then send the audio signal to the slave processor 122. This way, only one earbud of the pair of earbuds 110, 120 may be required to establish a communication link with the paired device, which may be more power efficient and ensure a longer battery life.

In some instances, the roles of the earbuds 110, 120 may change based on any of a number of factors. For example, since different roles may have different rates of power consumption, switching the roles of the earbuds 110, 120 may ensure that power in one of the earbuds does not become depleted before the other earbud. As another example, the earbuds 110, 120 may switch roles depending on which earbud can establish a stronger wireless connection with a paired device. As still another example, when the two earbuds 110, 120 are far apart, such as when being worn by two different users, the two earbuds 110, 120 may no longer have a reliable or strong communication link between them. In such instances, it may be necessary for both earbuds 110, 120 to establish communication links with other devices in order to independently receive signals.

Referring to FIG. 5, at block 510, it is determined, based on sensor signals from a pair of earbuds, whether the pair of earbuds are being worn by a same user or different users. In this regard, any of a number of sensor signals may be used for the determination. For instance, the processors 112 and/or 122 may receive and correlate sensor signals from motion sensors, such as IMU 370 of the first earbud 110 and IMU 380 of the second earbud 120. When being worn by the same user, the pair of earbuds 110, 120 are attached to a same rigid body (e.g., user's head) and thus would experience motion that is substantially the same. In contrast, when being worn by two different users, the pair of earbuds 110, 120 are attached to two different rigid bodies and thus would experience different motions. Therefore, the processors 112 and/or 122 may use the sensor signals from IMU 370 and 380 to correlate the linear motions and/or rotational motions experienced by the two earbuds 110, 120, and determine whether the earbuds 110, 120 are being worn by the same user or different users.

The processors 112 and/or 122 may perform any necessary processing of the sensor signals, such as converting the signals from the two earbuds 110, 120 into a same frame of reference, synchronizing the clocks or timestamps generated by the two earbuds 110, 120, filtering noise, etc. The sensor signals may include any of a number of measurements, such as linear and/or angular accelerations, linear and/or angular velocities, linear displacements, angle of rotations, etc.

As another example, the one or more processors 112 and/or 122 may receive and correlate sensor signals from one or more vibration sensors, such as the one or more microphones 330 of the first earbud 110 and the one or more microphones 340 of the second earbud 120. In this regard, processors 112 and/or 122 may determine that, when the voice and/or breathing patterns detected by the vibration sensors in both earbuds 110, 120 are substantially the same, the earbuds 110, 120 are being worn by the same user, and when the voice and/or breathing patterns detected by the vibration sensors are different, the earbuds 110, 120 are being worn by different users.

As other examples, the one or more processors 112, 122 may receive and correlate sensor signals from one or more electrical, magnetic, and/or optical sensors configured to measure waveforms generated by human skin or heart. In this regard, processors 112 and/or 122 may determine that, when the waveforms detected by the electrical, magnetic, and/or optical sensors of both earbuds 110, 120 are substantially the same, the earbuds 110, 120 are being worn by the same user, and when the waveforms detected by the electrical, magnetic, and/or optical sensors are different, the earbuds 110, 120 are being worn by different users.

Alternatively or additionally, electrical and/or magnetic sensors of one earbud of the pair of earbuds 110, 120 may be configured to detect a signal generated by the other earbud. Detection of such a signal may be different depending on whether the earbuds 110, 120 are being worn by the same user or different users, based on which the processors 112 and/or 122 may determine whether the earbuds 110, 120 are being worn by the same user. For example, when both earbuds 110, 120 are being worn by the same user, detection of such a signal may be faster and/or stronger than when the earbuds 110, 120 are being worn by different users. Further, electrical and/or magnetic sensors of the earbuds 110, 120 may be configured to detect signals generated or modulated by another device, based on which processors 112, 122 may determine whether the earbuds 110, 120 are being worn by the same user. For example, when another device sends a signal to both of the earbuds 110, 120, Doppler effects at the two earbuds 110, 120 may be similar when being worn by the same user, but different when being worn by different users.

As still other examples, processors 112 and/or 122 may receive and compare images taken by optical sensors, such as cameras, of both earbuds 110, 120, and determine whether the earbuds 110, 120 are being worn by the same user (e.g., substantially the same viewpoints) or different users (e.g., different viewpoints). Processors 112 and/or 122 may receive and compare sensor signals from positioning sensors of both earbuds 110, 120, and determine whether the earbuds 110, 120 are being worn by the same user (e.g., facing substantially the same direction) or different users (e.g., facing different directions). Processors 112 and/or 122 may receive from communication modules 117, 127 measurements of signal strengths for one or more communication links between the two earbuds 110, 120, based on which processors 112, 122 may determine whether the earbuds 110, 120 are being worn by the same user (e.g., stronger connection) or different users (e.g., weaker connection).

Then at block 520, based on determining that the pair of earbuds are being worn by the same user, the pair of earbuds are operated in a first mode so that one or more functions of the pair of earbuds are controlled based on a first set of input settings. This first set of input settings are thus used to control the earbuds when being used in a single user mode. In contrast, based on determining that the pair of earbuds are being worn by different users, at block 530, the pair of earbuds are operated in a second mode so that the one or more functions of the pair of earbuds are controlled based on a second set of input settings. This second set of input settings are thus used to control the earbuds when being used in a shared mode or multi-user mode.

The first set of input settings and the second set of input settings may include any of a number of inputs, such as gesture inputs, voice commands, etc. Any of a number of earbud functions may be controlled based on the inputs, such as functions relating to audio characteristics, selections of content, microphone characteristics, power, connections or pairing, etc. The inputs and the corresponding functions they control may be stored in memories, such as memories 114, 124, and/or otherwise made available to the processors 112, 122. Further in this regard, to meet different needs depending whether the pair of earbuds are being used by a single user or different users, the second set of input settings are different from the first set of input settings. As described below and illustrated by FIGS. 6A-7B, the differences in the settings may include the inputs themselves, the functions being controlled, and/or the manners that the functions are controlled based on the inputs.

FIGS. 6A and 6B illustrate operating with different gesture input settings based on determining whether the earbuds are being worn by the same user or different users. In this regard, gesture inputs may include ones involving contact, such as a swipe or tap on a surface of the earbuds 110, 120, and/or ones that do not involve contact, such as movements of a finger near the earbuds 110, 120. Further in this regard, activating and deactivating gesture inputs may include activating and deactivating respective sensors in earbuds 110, 120 configured for detecting gesture inputs, such as touch sensors, optical sensors, etc. The example gesture inputs described below are provided as mere illustrations, and in practice could be any of a number of gesture inputs.

FIG. 6A shows a single user mode where earbuds 110 and 120 are being worn by the same user 100. For instance, processors 112 and/or 122 may receive sensor signals from sensors of the pair of earbuds 110, 120, and determine based on the sensor signals that the earbuds 110, 120 are being worn by the same user. Processors 112 and/or 122 may then operate the earbuds 110, 120 in a first mode such that one or more functions are controlled using a first set of input settings. When operating with the first set of input settings, a first set of gesture inputs may be available for controlling functions of the earbuds 110, 120.

While the earbuds 110, 120 are operated with the first set of input settings, processors 112 and/or 122 may receive signals from one or more sensors of earbud 110 and/or 120, based on which a gesture input may be detected. The processors 112 and/or 122 may then control one or more functions of the pair of earbuds 110, 120 based on the detected gesture input. For example, processors 112 and/or 122 may receive sensor signals from one or more touch sensors in earbud 110 associated with a gesture input 610. Based on the sensor signals, processors 112 and/or 122 may detect that the gesture input 610 is an up-swipe at earbud 110, and determine, based on referencing the first set of gesture inputs stored in memories 114 and/or 124, that the gesture input 610 corresponds to a command to increase audio volume. The processors 112 and/or 122 may then control the one or more speakers 350, 360 of the respective earbuds 110, 120 to increase the audio volume accordingly.

As alternative or in addition to controlling components of the earbuds 110, 120, such as the speakers, processors 112 and/or 122 may send a control signal to a device that generated the underlying audio signals, based on this control signal, the device may alter the underlying audio signals. For example, while earbuds 110, 120 are outputting audio signals received from a paired device, processors 112 and/or 122 may detect a swipe forward gesture at earbud 120 corresponding to a command to increase the bass component, and send a control signal to the paired device including the command to increase the bass component. In response, the paired device may manipulate the audio signals in an audio file to increase the bass component, resulting in manipulated audio signals, and then send the resulting manipulated audio signals to the earbuds 110, 120. By allowing the paired device, instead of the processors 112 and/or 122, to manipulate the underlying audio signals, battery power of the earbuds 110, 120 may be conserved.

While operating with the first set of input settings, processors 112, 122 may apply a control to both earbuds 110, 120 based on detecting one gesture input. For instance, when a gesture corresponding to a command to increase audio volume is detected, processors 112, 122 may control one or more speakers 350, 360 of both earbuds 110, 120 to increase audio volume. As such, in some instances gesture inputs may be activated on only one of the two earbuds 110, 120 while operating in the single user mode. Such a configuration may provide more efficient power use and conserve battery life, and/or faster processing time.

Alternatively, gesture inputs may be activated on both earbuds 110, 120. In some instances such as shown in FIG. 6A, a same gesture may correspond to different commands depending on whether performed on the first earbud 110 or the second earbud 120. Thus in such cases the first set of gesture inputs stored in memories 114, 124 may further indicate that a given gesture corresponds to different commands depending on whether it is detected on earbud 110 or earbud 120. When sensor signals associated with a gesture is received, processors 112 and/or 122 may determine whether the gesture is detected at the first earbud 110 or the second earbud 120 in order to determine the corresponding command. For example, the gesture input 610 that is an up-swipe at the first earbud 110 may correspond to a command to increase audio volume, while a gesture input 620 that is an up-swipe at the second earbud 120 may correspond to a command to fast-forward 5s. Such a configuration may increase the number of possible commands based on a same set of gestures, thus improving user control of the earbuds 110, 120.

FIG. 6B shows a multi-user mode where earbuds 110 and 120 are being worn by two different users 100 and 200. For instance, processors 112 and/or 122 may receive sensor signals from sensors of the pair of earbuds 110, 120, and determine based on the sensor signals that the earbuds 110, 120 are being worn by two different users. Processors 112 and/or 122 may then operate the earbuds 110, 120 in a second mode so that one or more functions are controlled using a second set of input settings. When operating with the second set of input settings, a second set of gesture inputs may be available. The second set of gesture inputs may be different from the first set of gesture inputs, or may be the same as the first set of gesture inputs, but the manner of control under the two sets of input settings may be different. For example, in the first, single-user mode a given gesture may control a given function for both earbuds, in the second, multi-user mode the given gesture may control a given function for only the earbud where the gesture is detected.

While the earbuds 110, 120 are operating with the second set of input settings, processors 112 and 122 may receive sensor signals from one or more sensors of earbud 110 and 120 respectively. Based on these sensor signals, processors 112 and 122 may independently detect gestures, and control one or more functions of the respective earbud 110, 120 based on the detected gestures. For example, processor 112 may receive sensor signals from one or more touch sensors of earbud 110 associated with a gesture input 660. Based on the sensor signals, processors 112 may detect that the gesture input 660 is an up-swipe, and determine, based on referencing the second set of gesture inputs stored in memory 114, that the gesture corresponds to a command to increase audio volume. The processor 112 may then control one or more speakers 350 of earbud 110 to increase the audio volume accordingly. Independently, processors 122 may receive sensor signals from one or more touch sensors of earbud 120 associated with a gesture input 670. Based on the sensor signals, processor 122 may detect that the gesture input 670 is a down-swipe, and determine, based on referencing the second set of gesture inputs stored in memory 124, that the gesture input 670 corresponds to a command to decrease audio volume. The processors 122 may then control the one or more speakers 360 in earbud 120 to decrease the audio volume accordingly. As such, this configuration allows users sharing a pair of earbuds to have individual control over the earbud being worn, which may thereby improve user experience when earbuds are shared.

As alternative or in addition to controlling components of the earbuds 110, 120, such as the speakers, processors 112 and 122 may perform the individual control by sending a control signal to a device that generated the underlying audio signals. Based on this control signal, the device may alter the underlying audio signals. For example, while earbud 110 is outputting audio signals received from a paired device, processors 112 may detect a forward-swipe gesture corresponding to a command to increase the bass component, and send a control signal to the paired device including the command to increase the bass component. In response, the paired device may manipulate audio signals in an audio file to increase the bass component, resulting in manipulated audio signals, and then send the resulting manipulated audio signals to the earbud 110. However, absent also receiving such a command from the earbud 120, the paired device may continue to send the original audio signals to the earbud 120. Thus, earbuds 110 and 120 may be receiving and outputting two different audio signals when being worn by two different users.

While operating with the second set of input settings, a same gesture input detected at either earbud 110, 120 may correspond to a command for controlling the same function on the respective earbud 110, 120. Thus the second set of gesture inputs stored in memories 114, 124 may each correspond to a command to control a given function regardless of whether it is detected at the first or second earbud 110, 120. For example, an up-swipe may correspond to a command to increase audio volume regardless of whether the gesture is performed on the first earbud 110 or the second earbud 120. Such a configuration reduces complexity for both users and thus improves user friendliness.

In some instances, the earbuds 110, 120 may be configured to allow simultaneous detections of gesture inputs on both earbuds 110, 120. In other instances, while a gesture input is being detected on one earbud, gesture inputs may be temporarily deactivated on the other earbud. In still other examples, gesture inputs may be deactivated on both earbuds when operating in the multi-user mode. Such settings may be more power efficient and thus increase battery life, particularly when the earbuds 110, 120 are consuming power at higher rates, such as when both are establishing communication links with another device for receiving audio signals.

FIGS. 7A and 7B illustrate operations of a pair of earbuds with different voice command settings based on determining whether the earbuds are being worn by same user or different users. In this regard, the earbuds 110, 120 may be configured to receive voice commands as alternative to or in addition to gesture inputs. For example, in some instances the earbuds 110, 120 may be configured to enable voice commands when a particular gesture is detected. The example voice commands described below are provided as mere illustrations, and in practice could be any of a number of voice commands.

FIG. 7A shows a single-user mode where earbuds 110 and 120 are being worn by the same user 100. For instance, processors 112 and/or 122 may receive sensor signals from sensors of the pair of earbuds 110, 120, and determine based on the sensor signals that the earbuds 110, 120 are being worn by the same user. Processors 112 and/or 122 may then operate the earbuds 110, 120 in a first mode with a first set of input settings. For example, the first set of input settings may adjust features such as microphone activations, beamforming, voice command settings, or any of a variety of other features.

According to one example, processors 112 and/or 122 may activate only microphones 330 or microphones 340 at a given time to receive audio input from the user wearing both earbuds 110, 120, but not both at the same time. With the microphones activated, audio inputs may be received as voice commands, or for a call, such as a phone, voice, or video call. Such a configuration may provide more efficient power use and conserve battery life, and/or faster processing time. Alternatively, both microphones 330, 340 may be activated, for instance to construct a stronger or clearer signal.

According to another example, the first input settings may include beamforming settings. For instance, where the one or more microphones 330 and the one or more microphones 340 are both activated, they both may be configured to perform beamforming towards the mouth of the single user wearing both earbuds 110, 120. Alternatively, where only the one or more microphones 330 (or the one or more microphones 340) are activated, and where the activated microphones 330 (or microphones 340) include an array of microphones, the array of microphones may also be configured to perform beamforming towards the mouth of the single user wearing both earbuds 110, 120. Such beamforming configurations effectively provide noise cancelation to improve call quality and/or reliability of voice commands.

The first set of input settings may further include voice command settings. For instance, available voice commands and the corresponding functions controlled by the voice commands may be stored in memories 114, 124 or otherwise made accessible by processors 112, 122.

While the earbuds 110, 120 are operating with the first set of input settings, processors 112 and/or 122 may receive audio inputs from the one or more microphones 330 and/or 340 of earbud 110 and/or 120, based on which a voice command may be detected. The processors 112 and/or 122 may then control one or more functions of the pair of earbuds 110, 120 based on the detected voice command. For example, processors 112 and/or 122 may receive an audio input 710 from the one or more microphones 330 of earbud 110 and/or the one or more microphones 340 in earbud 120. Processors 112 and/or 122 may parse the audio input 710 to detect a voice command of "turn up the volume." Based on referencing the set of voice commands stored in memories 114 and/or 124, processors 112 and/or 122 may then control the speakers 350, 360 of the earbuds 110, 120 to increase the audio volume accordingly.

While operating with the first set of input settings, processors 112, 122 may apply a control to both earbuds 110, 120 based on detecting one voice command. For instance, when a voice command to increase audio volume is detected, processors 112, 122 may control one or more speakers 350, 360 of both earbuds 110, 120 to increase audio volume. As such, in some instances voice commands may be activated on only one of the two earbuds 110, 120 while operating in the single-user mode. Such a configuration may provide more efficient power use and conserve battery life, and/or faster processing time.

FIG. 7B shows a multi-user mode where earbuds 110 and 120 are being worn by two different users 100 and 200. For instance, processors 112 and/or 122 may receive sensor signals from sensors of the pair of earbuds 110, 120, and determine based on the sensor signals that the earbuds 110, 120 are being worn by two different users. Processors 112 and/or 122 may then operate the earbuds 110, 120 in a second mode with a second set of input settings. For example, processors 112 and 122 may activate both the one or more microphones 330 and the one or more microphones 340 to receive audio inputs from both users sharing the earbuds 110, 120. Using these input settings, audio inputs may be received from both users for voice commands, and/or for a call, such as a phone, voice, or video call. Such a configuration may allow both users to be heard clearly without requiring both users to be close to each other.

The second set of input settings may further include beamforming settings. For example, if both microphones 330 and microphones 340 include arrays of microphones, and both are activated, beamforming may be activated for microphones 330 towards the mouth of user 100 wearing earbud 110, and also activated for microphones 340 towards the mouth of user 200. Such a configuration ensures that audio inputs from both users are received at the respective earbud with reduced interference between the two users. As another example, if only microphones 330 (or microphones 340), which include an array of microphones, are activated, beamforming may be deactivated. Such a configuration ensures that, if microphones on only one of the earbuds 110, 120 is being used for audio input from both users, neither user's voice is being reduced as a result of beamforming. As still another example, where the one or more microphones 330 and the one or more microphones 340 each include a single microphone, instead of being arrays of microphones, beamforming may be deactivated for both microphones 330 and 340.

The second set of input settings may include voice command settings. In this regard, the same set of voice commands as in the first input settings may be available, or a different set of voice commands may be available. Additionally or alternatively, the manner of control of the functions under the two sets of voice commands may be different. For example, in the single-user mode a given voice command may control a function for both earbuds, in the multi-user mode the given gesture may control a function for only the earbud where the voice command is detected.

Where both microphones 330 and 340 are activated, processors 112 and 122 may receive audio inputs from microphones 330 of earbud 110 and/or microphones 340 of earbud 120, respectively. Processors 112 and 122 may independently parse these audio inputs to detect voice commands, and control one or more functions of the respective earbud 110, 120 based on the detected voice commands. For example, processor 112 may receive an audio input 720 from the one or more microphones 330 of earbud 110. By parsing the audio input 720 and referencing the voice commands stored in memory 114, processors 112 may detect a voice command of "turn up the volume." The processor 112 may then control one or more speakers 350 of earbud 110 to increase the audio volume accordingly. Independently, processor 122 may receive audio input 730 from one or more microphones 340 of earbud 120. By parsing the audio input 730 and referencing the voice commands stored in memory 124, processors 122 may detect a voice command of "turn down the volume." The processors 122 may then control one or more speakers in earbud 120 to decrease the audio volume accordingly. As such, this configuration allows users sharing a pair of earbuds to have individual control over the earbud being worn, which may thereby improve user experience when earbuds are shared. Alternatively, where only one of microphones 330 or microphones 340 are activated, both users may need to speak to the activated microphone for voice commands, or voice commands may be deactivated.

In some instances, the earbuds 110, 120 may be configured to allow simultaneous detections of voice commands on both earbuds 110, 120. In other instances, while voice command is being detected on one earbud, voice commands may be temporarily deactivated on the other earbud. In still other examples, voice commands may be deactivated on both earbuds when operating in the multi-user mode. Such a configuration may be more power efficient and thus increase battery life. This may be particularly beneficial when the earbuds 110, 120 are consuming power at higher rates, such as if both are establishing communication links with another device for receiving audio signals.

FIG. 8 shows an example flow diagram 800 for operating a pair of earbuds, such as earbuds 110, 120 of FIGS. 1A-1B, with different notification settings. It should be understood that the operations involved in the flow diagram 800 need not be performed in the precise order described. Rather, various operations may be handled in a different order or simultaneously, and operations may be added or omitted.

Flow diagram 800 may be performed by one or more processors, such as one or more processors 112 and/or 122 shown in FIG. 3. For example, processors 112 and 122 may both receive data, such as sensor signals from sensors in the respective earbuds 110, 120, make various determinations, and operate the respective earbuds 110, 120 as shown in the flow diagram 800. Alternatively, the earbuds 110, 120 may be configured to perform different functions, such as described above with reference to FIG. 5.

Referring to FIG. 8, at block 810, it is determined, based on sensor signals from a pair of earbuds, whether the pair of earbuds are being worn by a same user or different users. In this regard, any of a number of sensor signals may be used for the determination, such as those described above with reference to FIG. 5.

At block 820, based on determining that the pair of earbuds are being worn by the same user, the pair of earbuds are operated in a first mode with a first set of notification settings. Alternatively, based on determining that the pair of earbuds are being worn by different users, at block 830 the pair of earbuds are operated in a second mode with a second set of notification settings. The second set of notification settings may be different from the first set of notification settings.

FIGS. 9A and 9B illustrate operating a pair of earbuds with different notification settings based on determining whether the earbuds are being worn by the same user or different users. FIG. 9A shows a single user mode where earbuds 110 and 120 are being worn by the same user 100, and FIG. 9B shows a multi-user mode where earbuds 110 and 120 are being worn by two different users 100 and 200.

Referring to FIG. 9A, processors 112 and/or 122 may receive sensor signals from sensors of the pair of earbuds 110, 120, and determine based on the sensor signals that the earbuds 110, 120 are being worn by the same user. Processors 112 and/or 122 may then operate the earbuds 110, 120 in a first mode with a first set of notification settings. For example, read-out notifications may be activated in the first set of notification settings. Thus as shown in FIG. 9A, processors 112 and/or 122 may receive an alert 910 including information on an event, for example from a paired device such as phone 410. While operating with the first set of notification settings, processors 112 and/or 122 may then control the one or more speakers 350 and/or 360 to output an audio notification 920 including the information on the event.

Although not shown, the first set of notification settings may alternatively or additionally include other settings. For example, the earbuds 110, 120 may be controlled to output any of a number of sound effects, haptic effects, etc. Such configurations may allow differentiation between different types of events, such as a text, an email, an upcoming appointment, emergency alert, etc. Further, since both earbuds 110, 120 are being used by the same user, in some instances only microphones 330 or 340 in one of the earbuds may be used for outputting audio notifications, which may be more power efficient and save battery life.

By activating read-out notifications, the user may be immediately notified of upcoming events without having to check another device, such as a screen-based device, to be aware of upcoming events or to learn more about what the event is. Further in this regard, to protect privacy of the user, the first set of notification settings may require prior authentication and/or authorization. For example, authentication that the user using the earbuds is the same user of the paired device may be required, which may be implemented in any of a number of ways, such as usernames, passwords, multi-factor authentication, voice analysis, biometrics, etc.

In contrast, referring to FIG. 9B, processors 112 and/or 122 may receive sensor signals from sensors of the pair of earbuds 110, 120, and determine based on the sensor signals that the earbuds 110, 120 are being worn by two different users 100, 200. Processors 112 and/or 122 may then operate the earbuds 110, 120 in a second mode with a second set of notification settings. For example, read-out notifications may be deactivated in the second set of notification settings. Thus as shown in FIG. 9B, processors 112 and/or 122 may receive an alert 930 including information on an event, for example from a paired device such as phone 410. While operating with the second set of notification settings, processors 112 and/or 122 may control the one or more speakers 350 and/or 360 to output audio notification 940 and/or 950 without including the information on the event. For example, such audio notifications may include any of a number of sound effects, such as a "ding" noise.

Although not shown, the second set of notification settings may alternatively or additionally include other settings, for example the earbuds 110, 120 may be controlled to output any of a number of sound effects, haptic effects, etc. when an alert is received. As other alternatives, while operating with the second set of notification settings, processors 112 and/or 122 may control the earbuds 110, 120 to not output any notification in response to alerts received from another device, and/or block alerts sent by other devices. As still another example, processors 112 and 122 may operate the two earbuds 110, 120 with different notification settings. For example, read-out notifications may be activated on earbud 110 but not earbud 120. In this regard, to protect privacy of the user whose paired device is generating alerts, before using such a configuration the user of the paired device may be notified regarding which earbud will be outputting read-out notifications. Further, such a configuration may require prior authentication and/or authorization from the user of the paired device, which may be implemented in any of a number of ways, such as usernames, passwords, multi-factor authentication, voice analysis, biometrics, etc.

Deactivating read-out notifications in shared mode may provide greater privacy protection of users. Where an audio notification is produced without read-out of the information, the user whose paired device is generating the alert may still be notified, and may check the paired device for more information on the event.

In addition to or as alternative to the settings described above with reference to FIGS. 5-9B, the pair of earbuds may be operated with any of a number of additional settings based on determining whether the earbuds are being worn by the same user of different users. For example, processors 112 and/or 122 may operate the earbuds 110, 120 with a stereophonic setting when in the single-user mode, which may provide better sound quality. In contrast, processors 112 and/or 122 may operate the earbuds 110, 120 with a monophonic setting when in the multi-user mode, so that both users may hear all the channels despite only using one earbud.

Still further, the earbuds may be configured to generate states of the earbuds, such as whether the earbuds are being worn by the same user, as outputs. For instance, an API may be created allowing states of the earbuds to be accessed by one or more other applications, such as applications on another device or web-based applications. These applications may then use the states of the earbuds to generate signals for the earbuds that are tailored to the single-user or multi-user mode.

FIG. 10 shows an example flow diagram 1000 for outputting states of a pair of earbuds, such as earbuds 110, 120 of FIGS. 1A-1B. It should be understood that the operations involved in the flow diagram 1000 need not be performed in the precise order described. Rather, various operations may be handled in a different order or simultaneously, and operations may be added or omitted.

Flow diagram 1000 may be performed by one or more processors, such as one or more processors 112 and/or 122 shown in FIG. 3. For example, processors 112 and 122 may both receive data, such as sensor signals from sensors in the respective earbuds 110, 120, make various determinations, and output states of the respective earbuds 110, 120 as shown in the flow diagram 1000. Alternatively, the earbuds 110, 120 may be configured to perform different functions, such as described above with reference to FIG. 5.

Referring to FIG. 10, at block 1010, it is determined, based on sensor signals from a pair of earbuds, whether the pair of earbuds are being worn by a same user or different users. In this regard, any of a number of sensor signals may be used for the determination, such as those described above with reference to FIG. 5.

At block 1020, states of the pair of earbuds, including whether the pair of earbuds are being worn by the same user or different users, are generated as one or more outputs. The states may additionally or alternatively include other settings of the earbuds, such as any of the input settings, the notification settings, and other input or output settings described above. For example, processors 112 and/or 122 may output the states to an API. The API may be accessible by another device such as a paired device, or a web-based application or device. Alternatively or additionally, processors 112 and/or 122 may output the states directly to another application, such as an application running on a paired device, a web-based application, etc. The application may be any of a number of applications, such as a translation application, a conference call application, a multimedia application, etc. Further in this regard, outputting the states of the earbuds may require prior authentication and/or authorization from the user(s), which may be implemented in any of a number of ways, such as usernames, passwords, multi-factor authentication, voice analysis, biometrics, etc.

At block 1030, signals are received from one or more applications based on the states of the pair of earbuds. For instance, one or more authorized applications may receive the states of the earbuds directly from processors 112, 122, or if the states of the earbuds were made available in an API, the applications may access the API, and generate signals, such as audio content for the earbuds based on the states of the earbuds. As an example, a translation application on a paired device may access the states of the earbuds 110, 120. If the earbuds 110, 120 are in a single-user mode, the translation application may generate translated audio content in one language to both earbuds 110, 120. In contrast, if the earbuds 110, 120 are in a multi-user mode, the translation application may generate translated audio content in a first language to earbud 110, and generate translated audio content in a second language to earbud 120. In some instances additional inputs, such as language selections for the translation application, may be required.

Additionally or alternatively, the application may also use the states of the earbuds to process signals received from the earbuds. Continuing from the translation application example, if the earbuds 110, 120 are in a single-user mode, the translation application may receive audio input in a first language from one or both earbuds 110, 120, and translate the audio input received into a second language. In contrast, if the earbuds 110, 120 are in a multi-user mode, the translation application may receive audio inputs separately from earbuds 110, 120, and then translate the audio inputs. For example, in the case where user 100 and user 200 are using the earbuds 110, 120 to translate a conversation between them, the translation may be performed between the two languages used by the two users 100, 200. In the case where both users 100 and user 200 are using the earbuds 110, 120 to translate an audio file or call, the translation may be into the same language if users 100 and 200 speak the same language, or to two different languages if the users 100 and 200 speak different languages.

At block 1040, the pair of earbuds are controlled to output audio signals based on the signals received from the one or more applications. Continuing from the translation example, processors 112 and/or 122 may control earbuds 110, 120 to output audio signals including the translated audio received from the translation application.

The technology includes features that improve various functionalities of earbuds. For example, the technology provides for individual control of earbud functions by multiple users while operating in the shared mode. The technology also provides notification capabilities with additional user privacy protections when the earbuds are in the shared mode. By adjusting components and features in one or both earbuds based on the mode of operation, signal quality may be improved as well as power efficiency and battery life. Further, by sharing the states of the earbuds with other applications, the technology promotes development of new features by other developers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   determining, by one or more processors based on sensor signals from a pair of earbuds, whether the pair of earbuds are being worn by a same user or different users;
   generating, by the one or more processors, states of the pair of earbuds, the states including whether the pair of earbuds are being worn by the same user or different users;
   outputting, by the one or more processors, the states of the pair of earbuds to one or more applications;
   receiving, by the one or more processors, signals from the one or more applications based on the states of the pair of earbuds;
   operating, by the one or more processors based on determining that the pair of earbuds are being worn by the same user, the pair of earbuds in a first mode so that one or more functions of the pair of earbuds are controlled based on a first set of input settings; and
   operating, by the one or more processors based on determining that the pair of earbuds are being worn by different users, the pair of earbuds in a second mode so that the one or more functions of the pair of earbuds are controlled based on a second set of input settings, the second set of input settings being different from the first set of input settings.

2. The method of claim 1, further comprising:
   receiving, by the one or more processors while the pair of earbuds are operating in the first mode, a given input;
   determining, by the one or more processors, a given command corresponding to the given input according to the first set of input settings; and
   controlling, by the one or more processors based on the given command, a given function of both earbuds of the pair of earbuds.

3. The method of claim 2, further comprising:
   determining, by the one or more processors, whether the given input is received at a first earbud of the pair of earbuds or a second earbud of the pair of earbuds, wherein controlling the given function of both earbuds is further based on whether the given input is received at the first earbud or the second earbud.

4. The method of claim 1, further comprising:
   receiving, by the one or more processors while the pair of earbuds are operating in the second mode, a given input at a first ear bud of the pair of earbuds;
   determining, by the one or more processors, a given command corresponding to the given input according to the second set of input settings; and
   controlling, by the one or more processors based on the given command, a given function of the first earbud without affecting a second ear bud of the pair of earbuds.

5. The method of claim 1, wherein at least one of the first set of input settings and the second set of input settings includes one or more gesture input settings.

6. The method of claim 1, wherein at least one of the first set of input settings and the second set of input settings includes one or more voice command settings.

7. The method of claim 1, further comprising:
activating, by the one or more processors while operating in the first mode, one or more microphones of a first earbud of the pair of earbuds without activating one or more microphones of a second earbud of the pair of earbuds.

8. The method of claim 7, further comprising:
activating, by the one or more processors while operating in the first mode, beamforming for the one or more microphones of the first earbud towards the user wearing the pair of earbuds, wherein the one or more microphones of the first earbud include an array of microphones.

9. The method of claim 1, further comprising:
activating, by the one or more processors while operating in the second mode, one or more microphones of a first earbud of the pair of earbuds and one or more microphones of a second earbud of the pair of earbuds.

10. The method of claim 9, further comprising:
activating, by the one or more processors while operating in the second mode, beamforming for the one or more microphones of the first ear bud towards a first user and beamforming on the one or more microphones of the second earbud towards a second user, wherein the one or more microphones of the first earbud and the one or more microphones of the second earbud each include an array of microphones.

11. The method of claim 1, further comprising:
controlling, by the one or more processors while operating in the first mode, the pair of earbuds to have a first set of notification settings; and
controlling, by the one or more processors while operating in the second mode, the pair of earbuds to have a second set of notification settings, the second set of notification settings being different from the first set of notification settings.

12. The method of claim 11, further comprising:
receiving, by the one or more processors from another device, an alert including information on an event; and
controlling, by the one or more processors while using the first set of notification settings, the pair of earbuds to output an audio notification including the information on the event.

13. The method of claim 11, further comprising:
receiving, by the one or more processors from another device, an alert including information on an event; and
controlling, by the one or more processors while using the second set of notification settings, the pair of earbuds to output an audio notification without including the information on the event.

14. The method of claim 1, wherein the one or more functions of the pair of earbuds includes the output of an audio signal.

15. The method of claim 14, wherein:
responsive to the earbuds operating in the first mode, the audio signal is configured to be stereophonic; and
responsive to the earbuds operating in the second mode, the audio signal is configured to be monophonic.

16. A pair of earbuds, comprising:
one or more processors configured to:
determine, based on sensor signals from the pair of earbuds, whether the pair of earbuds are being worn by a same user or different users;
generate states of the pair of earbuds, the states including whether the pair of earbuds are being worn by the same user or different users;
output the states of the pair of earbuds to one or more applications;
receive signals from the one or more applications based on the states of the pair of earbuds;
operate, based on determining that the pair of earbuds are being worn by the same user, the pair of earbuds in a first mode so that one or more functions of the pair of earbuds are controlled based on a first set of input settings; and
operate, based on determining that the pair of earbuds are being worn by different users, the pair of earbuds in a second mode so that the one or more functions of the pair of earbuds are controlled based on a second set of input settings, the second set of input settings being different from the first set of input settings.

17. The pair of earbuds of claim 16, wherein the one or more processors are further configured to:
receive, while the pair of earbuds are operating in the first mode, a given input;
determine a given command corresponding to the given input according to the first set of input settings; and
control, based on the given command, a given function of both earbuds of the pair of earbuds.

18. The pair of earbuds of claim 16, wherein the one or more processors are further configured to:
receive, while the pair of earbuds are operating in the second mode, a given input at a first earbud of the pair of earbuds;
determine a given command corresponding to the given input according to the second set of input settings; and
control, based on the given command, a given function of the first earbud without affecting a second earbud of the pair of earbuds.

19. The pair of earbuds of claim 16, wherein the one or more processors are further configured to:
control, while operating in the first mode, the pair of earbuds to have a first set of notification settings; and
control, while operating in the second mode, the pair of earbuds to have a second set of notification settings, the second set of notification settings being different from the first set of notification settings.

20. A non-transitory computer-computer-readable storage medium storing instructions executable by one or more processors for performing a method, comprising:
determining, based on sensor signals from a pair of earbuds, whether the pair of earbuds are being worn by a same user or different users;
generating, by the one or more processors, states of the pair of earbuds, the states including whether the pair of earbuds are being worn by the same user or different users;
outputting, by the one or more processors, the states of the pair of earbuds to one or more applications;
receiving, by the one or more processors, signals from the one or more applications based on the states of the pair of earbuds;
operating, based on determining that the pair of earbuds are being worn by the same user, the pair of earbuds in a first mode so that one or more functions of the pair of earbuds are controlled based on a first set of input settings; and
operating, based on determining that the pair of earbuds are being worn by different users, the pair of earbuds in a second mode so that the one or more functions of the pair of earbuds are controlled based on a second set of input settings, the second set of input settings being different from the first set of input settings.

\* \* \* \* \*